(12) United States Patent
Starke et al.

(10) Patent No.: US 12,374,014 B2
(45) Date of Patent: Jul. 29, 2025

(54) PREDICTING FACIAL EXPRESSIONS USING CHARACTER MOTION STATES

(71) Applicant: Electronic Arts Inc., Redwood City, CA (US)

(72) Inventors: Wolfram Sebastian Starke, Edinburgh (GB); Igor Borovikov, Foster City, CA (US); Harold Henry Chaput, Castro Valley, CA (US)

(73) Assignee: Electronic Arts Inc., Redwood City, CA (US)

( * ) Notice: Subject to any disclaimer, the term of this patent is extended or adjusted under 35 U.S.C. 154(b) by 146 days.

(21) Appl. No.: 17/643,065

(22) Filed: Dec. 7, 2021

(65) Prior Publication Data

US 2023/0177755 A1 Jun. 8, 2023

(51) Int. Cl.
*G06T 13/40* (2011.01)
*G06N 20/20* (2019.01)
(Continued)

(52) U.S. Cl.
CPC ............. *G06T 13/40* (2013.01); *G06N 20/20* (2019.01); *G06T 13/205* (2013.01); *G06T 17/205* (2013.01)

(58) Field of Classification Search
None
See application file for complete search history.

(56) References Cited

U.S. PATENT DOCUMENTS 5,274,801 A 12/1993 Gordon
5,548,798 A 8/1996 King
(Continued)

FOREIGN PATENT DOCUMENTS

CN 102509272 A 6/2012
CN 103546736 A 1/2014
(Continued)

OTHER PUBLICATIONS

Anagnostopoulos et al., "Intelligent modification for the daltonization process," International Conference on Computer Vision, Published in 2007 by Applied Computer Science Group of digitized paintings.
Andersson et al., "Virtual Texturing with WebGL," Master's thesis, Chalmers University of Technology, Gothenburg, Sweden (2012).
(Continued)

*Primary Examiner* — Aaron M Richer
(74) *Attorney, Agent, or Firm* — Knobbe, Martens, Olson & Bear, LLP

(57) ABSTRACT

Systems and methods for identifying one or more facial expression parameters associated with a pose of a character are disclosed. A system may execute a game development application to identify facial expression parameters for a particular pose of a character. The system may receive an input identifying the pose of the character. Further, the system may provide the input to a machine learning model. The machine learning model may be trained based on a plurality of poses and expected facial expression parameters for each pose. Further, the machine learning model can identify a latent representation of the input. Based on the latent representation of the input, the machine learning model can generate one or more facial expression parameters of the character and output the one or more facial expression parameters. The system may also generate a facial expression of the character and output the facial expression.

20 Claims, 7 Drawing Sheets

(51) Int. Cl.
*G06T 13/20* (2011.01)
*G06T 17/20* (2006.01)

(56) References Cited

U.S. PATENT DOCUMENTS

| | | | |
|---|---|---|---|
| 5,982,389 | A | 11/1999 | Guenter et al. |
| 5,999,195 | A | 12/1999 | Santangeli |
| 6,064,808 | A | 5/2000 | Kapur et al. |
| 6,088,040 | A | 7/2000 | Oda et al. |
| 6,253,193 | B1 | 6/2001 | Ginter et al. |
| 6,556,196 | B1 | 4/2003 | Blanz et al. |
| 6,961,060 | B1 | 11/2005 | Mochizuki et al. |
| 7,006,090 | B2 | 2/2006 | Mittring |
| 7,403,202 | B1 | 7/2008 | Nash |
| 7,415,152 | B2 | 8/2008 | Jiang et al. |
| 7,944,449 | B2 | 5/2011 | Petrovic et al. |
| 8,100,770 | B2 | 1/2012 | Yamazaki et al. |
| 8,142,282 | B2 | 3/2012 | Canessa et al. |
| 8,154,544 | B1 | 4/2012 | Cameron et al. |
| 8,207,971 | B1 | 6/2012 | Koperwas et al. |
| 8,267,764 | B1 | 9/2012 | Aoki et al. |
| 8,281,281 | B1 | 10/2012 | Smyrl et al. |
| 8,395,626 | B2 | 3/2013 | Millman |
| 8,398,476 | B1 | 3/2013 | Sidhu et al. |
| 8,406,528 | B1 | 3/2013 | Hatwich |
| 8,540,560 | B2 | 9/2013 | Crowley et al. |
| 8,599,206 | B2 | 12/2013 | Hodgins et al. |
| 8,624,904 | B1 | 1/2014 | Koperwas et al. |
| 8,648,863 | B1 | 2/2014 | Anderson et al. |
| 8,860,732 | B2 | 10/2014 | Popovic et al. |
| 8,914,251 | B2 | 12/2014 | Ohta |
| 9,001,132 | B1 | 4/2015 | Wooley |
| 9,117,134 | B1 | 8/2015 | Geiss et al. |
| 9,256,973 | B2 | 2/2016 | Koperwas et al. |
| 9,317,954 | B2 | 4/2016 | Li et al. |
| 9,483,860 | B2 | 11/2016 | Hwang et al. |
| 9,616,329 | B2 | 4/2017 | Szufnara et al. |
| 9,652,879 | B2 | 5/2017 | Aguado |
| 9,741,146 | B1 | 8/2017 | Nishimura |
| 9,811,716 | B2 | 11/2017 | Kim et al. |
| 9,826,898 | B1 | 11/2017 | Jin et al. |
| 9,858,700 | B2 | 1/2018 | Rose et al. |
| 9,861,898 | B2 | 1/2018 | Miura et al. |
| 9,947,123 | B1 | 4/2018 | Green |
| 9,984,658 | B2 | 5/2018 | Bonnier et al. |
| 9,990,754 | B1 | 6/2018 | Waterson et al. |
| 9,996,940 | B1 * | 6/2018 | Yamasaki ............... G06T 11/00 |
| 10,022,628 | B1 | 7/2018 | Matsumiya et al. |
| 10,096,133 | B1 | 10/2018 | Andreev |
| 10,118,097 | B2 | 11/2018 | Stevens |
| 10,198,845 | B1 | 2/2019 | Bhat et al. |
| 10,314,477 | B1 | 6/2019 | Goodsitt et al. |
| 10,388,053 | B1 | 8/2019 | Carter, Jr. et al. |
| 10,403,018 | B1 | 9/2019 | Worsham |
| 10,440,443 | B2 | 10/2019 | Casey et al. |
| 10,535,174 | B1 | 1/2020 | Rigiroli et al. |
| 10,726,611 | B1 | 7/2020 | Court |
| 10,733,765 | B2 | 8/2020 | Andreev |
| 10,755,466 | B2 | 8/2020 | Chamdani et al. |
| 10,792,566 | B1 | 10/2020 | Schmid |
| 10,825,220 | B1 | 11/2020 | Chang et al. |
| 10,856,733 | B2 | 12/2020 | Anderson et al. |
| 10,860,838 | B1 | 12/2020 | Elahie et al. |
| 10,878,540 | B1 | 12/2020 | Stevens |
| 10,902,618 | B2 | 1/2021 | Payne et al. |
| 10,986,400 | B2 | 4/2021 | Hua et al. |
| 11,017,560 | B1 | 5/2021 | Gafni et al. |
| 11,403,513 | B2 | 8/2022 | Hasenclever et al. |
| 11,562,523 | B1 | 1/2023 | Starke et al. |
| 11,670,030 | B2 | 6/2023 | Shi et al. |
| 11,830,121 | B1 | 11/2023 | Starke et al. |
| 11,995,754 | B2 | 5/2024 | Starke et al. |
| 12,138,543 | B1 | 11/2024 | Starke et al. |
| 12,205,214 | B2 | 1/2025 | Starke et al. |
| 2002/0054054 | A1 | 5/2002 | Sanbe |
| 2002/0089504 | A1 | 7/2002 | Merrick et al. |
| 2002/0180739 | A1 | 12/2002 | Reynolds et al. |
| 2003/0038818 | A1 | 2/2003 | Tidwell |
| 2004/0027352 | A1 | 2/2004 | Minakuchi |
| 2004/0227760 | A1 | 11/2004 | Anderson et al. |
| 2004/0227761 | A1 | 11/2004 | Anderson et al. |
| 2005/0237550 | A1 | 10/2005 | Hu |
| 2006/0036514 | A1 | 2/2006 | Steelberg et al. |
| 2006/0149516 | A1 | 7/2006 | Bond et al. |
| 2006/0217945 | A1 | 9/2006 | Leprevost |
| 2006/0262114 | A1 | 11/2006 | Leprevost |
| 2007/0085851 | A1 | 4/2007 | Muller et al. |
| 2007/0097125 | A1 | 5/2007 | Xie et al. |
| 2008/0049015 | A1 | 2/2008 | Elmieh et al. |
| 2008/0111831 | A1 | 5/2008 | Son et al. |
| 2008/0152218 | A1 | 6/2008 | Okada |
| 2008/0268961 | A1 | 10/2008 | Brook |
| 2008/0273039 | A1 | 11/2008 | Girard |
| 2008/0316202 | A1 | 12/2008 | Zhou et al. |
| 2009/0066700 | A1 | 3/2009 | Harding et al. |
| 2009/0195544 | A1 | 8/2009 | Wrinch et al. |
| 2009/0315839 | A1 | 12/2009 | Wilson et al. |
| 2010/0134501 | A1 | 6/2010 | Lowe et al. |
| 2010/0251185 | A1 | 9/2010 | Pattenden |
| 2010/0277497 | A1 | 11/2010 | Dong et al. |
| 2011/0012903 | A1 | 1/2011 | Girard |
| 2011/0074807 | A1 | 3/2011 | Inada et al. |
| 2011/0086702 | A1 | 4/2011 | Borst et al. |
| 2011/0119332 | A1 | 5/2011 | Marshall et al. |
| 2011/0128292 | A1 | 6/2011 | Ghyme et al. |
| 2011/0164831 | A1 | 7/2011 | Van Reeth et al. |
| 2011/0187731 | A1 | 8/2011 | Tsuchida |
| 2011/0269540 | A1 | 11/2011 | Gillo et al. |
| 2011/0292055 | A1 | 12/2011 | Hodgins et al. |
| 2012/0029699 | A1 | 2/2012 | Jing |
| 2012/0083330 | A1 | 4/2012 | Ocko |
| 2012/0115580 | A1 | 5/2012 | Hornik et al. |
| 2012/0220376 | A1 | 8/2012 | Takayama et al. |
| 2012/0244941 | A1 | 9/2012 | Ostergren et al. |
| 2012/0275521 | A1 | 11/2012 | Cui et al. |
| 2012/0303343 | A1 | 11/2012 | Sugiyama et al. |
| 2012/0313931 | A1 | 12/2012 | Matsuike et al. |
| 2013/0050464 | A1 | 2/2013 | Kang |
| 2013/0063555 | A1 | 3/2013 | Matsumoto et al. |
| 2013/0120439 | A1 | 5/2013 | Harris et al. |
| 2013/0121618 | A1 | 5/2013 | Yadav |
| 2013/0222433 | A1 | 8/2013 | Chapman et al. |
| 2013/0235045 | A1 | 9/2013 | Corazza et al. |
| 2013/0263027 | A1 | 10/2013 | Petschnigg et al. |
| 2013/0311885 | A1 | 11/2013 | Wang et al. |
| 2014/0002463 | A1 | 1/2014 | Kautzman et al. |
| 2014/0198106 | A1 | 7/2014 | Sumner et al. |
| 2014/0198107 | A1 | 7/2014 | Thomaszewski et al. |
| 2014/0285513 | A1 | 9/2014 | Aguado |
| 2014/0327694 | A1 | 11/2014 | Cao et al. |
| 2015/0113370 | A1 | 4/2015 | Flider |
| 2015/0126277 | A1 | 5/2015 | Aoyagi |
| 2015/0187113 | A1 | 7/2015 | Rubin et al. |
| 2015/0235351 | A1 | 8/2015 | Mirbach et al. |
| 2015/0243326 | A1 | 8/2015 | Pacurariu et al. |
| 2015/0381925 | A1 | 12/2015 | Varanasi et al. |
| 2016/0026926 | A1 | 1/2016 | Yeung et al. |
| 2016/0042548 | A1 | 2/2016 | Du et al. |
| 2016/0071470 | A1 | 3/2016 | Kim et al. |
| 2016/0217723 | A1 | 7/2016 | Kim et al. |
| 2016/0243699 | A1 | 8/2016 | Kim |
| 2016/0307369 | A1 | 10/2016 | Freedman et al. |
| 2016/0314617 | A1 | 10/2016 | Forster et al. |
| 2016/0354693 | A1 | 12/2016 | Yan et al. |
| 2017/0132827 | A1 | 5/2017 | Tena et al. |
| 2017/0221250 | A1 | 8/2017 | Aguado |
| 2017/0301310 | A1 | 10/2017 | Bonnier et al. |
| 2017/0301316 | A1 | 10/2017 | Farell |
| 2018/0122125 | A1 | 5/2018 | Brewster |
| 2018/0165864 | A1 | 6/2018 | Jin et al. |
| 2018/0211102 | A1 | 7/2018 | Alsmadi |
| 2018/0239526 | A1 | 8/2018 | Varanasi et al. |
| 2018/0293736 | A1 | 10/2018 | Rahimi et al. |
| 2019/0073826 | A1 | 3/2019 | Bailey et al. |

(56) References Cited

U.S. PATENT DOCUMENTS

| | | | |
|---|---|---|---|
| 2019/0147224 A1 | 5/2019 | Li et al. | |
| 2019/0228316 A1 | 7/2019 | Felsen et al. | |
| 2019/0295305 A1 | 9/2019 | Yang et al. | |
| 2019/0303658 A1 | 10/2019 | Ando et al. | |
| 2019/0340803 A1 | 11/2019 | Comer | |
| 2019/0392587 A1 | 12/2019 | Nowozin et al. | |
| 2020/0005138 A1 | 1/2020 | Wedig et al. | |
| 2020/0035009 A1 | 1/2020 | Comer et al. | |
| 2020/0035010 A1 | 1/2020 | Kim | |
| 2020/0058148 A1 | 2/2020 | Blaylock et al. | |
| 2020/0222757 A1 | 7/2020 | Yang et al. | |
| 2020/0294299 A1 | 9/2020 | Rigiroli et al. | |
| 2020/0353311 A1 | 11/2020 | Ganguly et al. | |
| 2020/0388065 A1 | 12/2020 | Miller, IV et al. | |
| 2020/0402284 A1* | 12/2020 | Saragih | G06T 7/70 |
| 2021/0019916 A1 | 1/2021 | Andreev | |
| 2021/0166459 A1 | 6/2021 | Miller, IV | |
| 2021/0217184 A1 | 7/2021 | Payne et al. | |
| 2021/0220739 A1 | 7/2021 | Zinno et al. | |
| 2021/0292824 A1 | 9/2021 | Zhang et al. | |
| 2021/0312689 A1 | 10/2021 | Akhoundi et al. | |
| 2021/0335004 A1 | 10/2021 | Zohar et al. | |
| 2021/0375021 A1 | 12/2021 | Starke et al. | |
| 2021/0383585 A1 | 12/2021 | Zhao et al. | |
| 2021/0406765 A1 | 12/2021 | Zhang et al. | |
| 2022/0035443 A1 | 2/2022 | Winold et al. | |
| 2022/0068000 A1 | 3/2022 | Herman et al. | |
| 2022/0076472 A1 | 3/2022 | Bocquelet et al. | |
| 2022/0101646 A1* | 3/2022 | McDonald | G06V 40/161 |
| 2022/0148335 A1 | 5/2022 | Liu | |
| 2022/0215232 A1 | 7/2022 | Pardeshi et al. | |
| 2022/0230376 A1 | 7/2022 | Rozantsev et al. | |
| 2022/0254157 A1 | 8/2022 | Fu et al. | |
| 2022/0292751 A1* | 9/2022 | Kimura | G06T 7/00 |
| 2022/0319087 A1* | 10/2022 | Zhang | G06T 15/04 |
| 2022/0379167 A1 | 12/2022 | Lee | |
| 2023/0010480 A1 | 1/2023 | Li et al. | |
| 2023/0123820 A1 | 4/2023 | Wang | |
| 2023/0186541 A1 | 6/2023 | Starke et al. | |
| 2023/0186543 A1 | 6/2023 | Starke et al. | |
| 2023/0237724 A1 | 7/2023 | Starke et al. | |
| 2023/0267668 A1 | 8/2023 | Starke et al. | |
| 2023/0300667 A1 | 9/2023 | Baek | |
| 2023/0306667 A1 | 9/2023 | Hopkins | |
| 2023/0310998 A1 | 10/2023 | Starke et al. | |
| 2023/0326113 A1 | 10/2023 | Hellge | |
| 2023/0334744 A1 | 10/2023 | Liu | |
| 2023/0394735 A1 | 12/2023 | Shi et al. | |
| 2024/0257429 A1 | 8/2024 | Starke et al. | |
| 2024/0307779 A1 | 9/2024 | Wu | |
| 2024/0331293 A1 | 10/2024 | Borovikov et al. | |

FOREIGN PATENT DOCUMENTS

| | | | | |
|---|---|---|---|---|
| CN | 105405380 A | 3/2016 | | |
| CN | 105825778 A | 8/2016 | | |
| CN | 110039546 A | 7/2019 | | |
| JP | 2018-520820 A | 8/2018 | | |
| JP | 2019-162400 A | 9/2019 | | |
| WO | WO 2019/184633 A1 | 10/2019 | | |
| WO | WO-2020204948 A1 * | 10/2020 | | G11B 27/031 |

OTHER PUBLICATIONS

Avenali, "Color Vision Deficiency and Video Games," The Savannah College of Art and Design, Mar. 2013.

Badlani et al., "A Novel Technique for Modification of Images for Deuteranopic Viewers," May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., "Nonlinear Finite Elements for Continua and Structures," Second Edition, Wiley (Jan. 2014), 727 pages (uploaded in 3 parts).

Blanz et al., "A morphable model for the synthesis of 3D faces," In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video," Sep. 2003, vol. 22, No. 3, pp. 641-650, 10 pages.

Chao et al., "A Simple Geometric Model for Elastic Deformations," 2010, 6 pgs.

Clavet, "Motion matching and the road to next-gen animation," In Proc. of GDC. 2016 (Year: 2016).

Cook et al., "Concepts and Applications of Finite Element Analysis," 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects," IEEE Transactions on Visualization and Computer Graphics, vol. X, No. X, Jul. 2010, 16 pgs.

Diziol et al., "Robust Real-Time Deformation of Incompressible Surface Meshes," to appear in Proceedings of the 2011 ACM SIGGRAPH/Eurographics Symposium on Computer Animation (2011), 10 pgs.

Dudash, "Skinned instancing," NVidia white paper(2007).

Fikkkan, "Incremental loading of terrain textures," MS thesis. Institutt for datateknikk og informasjonsvitenskap, 2013.

Geijtenbeek et al., "Interactive Character Animation using Simulated Physics," Games and Virtual Worlds, Utrecht University, The Netherlands, The Eurographics Association 2011, 23 pgs.

Geijtenbeek et al. "Interactive Character Animation Using Simulated Physics: A State-of-the-Art Review," Computer Graphics forum, vol. 31, 2012 (Year: 2012), 24 pgs.

Georgii et al., "Corotated Finite Elements Made Fast and Stable," Workshop in Virtual Reality Interaction and Physical Simulation VRIPHYS (2008), 9 pgs.

Habbie et al., "A Recurrent Variational Autoencoder for Human Motion Synthesis," 2017, in 12 pages.

Halder et al., "Image Color Transformation for Deuteranopia Patients using Daltonization," IOSR Journal of VLSI and Signal Processing (IOSR-JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez et al., "Simulating and visualizing real-time crowds on GPU clusters," Computacion y Sistemas 18.4 (2014): 651-664.

Holden et al., "Phase-functioned neural networks for character control," ACM Transactions on Graphics (TOG). Jul. 20, 2017;36(4): 1-3. (Year: 2017).

Hu et al., "Face recognition by an albedo based 3D morphable model," In Biometrics (IJCB), 2014 IEEE International Joint Conference on Sep. 29, 2014 (pp. 1-8). IEEE.

Hu, "Face Analysis using 3D Morphable Models," Ph.D. Thesis, University of Surrey, Apr. 2015, pp. 1-112.

Irving et al., "Invertible Finite Elements for Robust Simulation of Large Deformation," Eurographics/ACM SIGGRAPH Symposium on Computer Animation (2004), 11 pgs.

Kaufmann et al., "Flexible Simulation of Deformable Models Using Discontinuous Galerkin FEM," Oct. 1, 2008, 20 pgs.

Kavan et al., "Skinning with Dual Quaternions," 2007, 8 pgs.

Kim et al., "Long Range Attachments—A Method to Simulate Inextensible Clothing in Computer Games," Eurographics/ACM SIGGRAPH Symposium on Computer Animation (2012), 6 pgs.

Klein, "Rendering Textures Up Close in a 3D Environment Using Adaptive Micro-Texturing," Diss. Mills College, 2012.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation," University of Washington, Bungie, Adobe Systems, 8 pgs, obtained Mar. 20, 2015.

Levine, S. et al., "Continuous Character Control with Low-Dimensional Embeddings," Stanford University, University of Washington, 10 pgs, obtained Mar. 20, 2015.

(56) References Cited

OTHER PUBLICATIONS

Macklin et al., "Position Based Fluids," to appear in ACM TOG 32(4), 2013, 5 pgs.
McAdams et al., "Efficient Elasticity for Character Skinning with Contact and Collisions," 2011, 11 pgs.
McDonnell et al., "Clone attack! perception of crowd variety," ACM Transactions on Graphics (TOG). vol. 27. No. 3. ACM, 2008.
Muller et al., "Meshless Deformations Based on Shape Matching," SIGGRAPH 2005, 29 pgs.
Muller et al., "Adding Physics to Animated Characters with Oriented Particles," Workshop on Virtual Reality Interaction and Physical Simulation VRIPHYS (2011), 10 pgs.
Muller et al., "Real Time Dynamic Fracture with Volumetric Approximate Convex Decompositions," ACM Transactions of Graphics, Jul. 2013, 11 pgs.
Muller et al., "Position Based Dynamics," VRIPHYS 2006, 2014. 10.21, Computer Graphics, Korea University, 23 pgs.
Musse et al., "Hierarchical model for real time simulation of virtual human crowds," IEEE Transactions on Visualization and Computer Graphics 7.2 (2001): 152-164.
Nguyen et al., "Adaptive Dynamics With Hybrid Response," 2012, 4 pgs.
O'Brien et al., "Graphical Modeling and Animation of Brittle Fracture," GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment," Eurographics/ACM SIGGRAPH Symposium on Computer Animation (2009), 12 pgs.
Pelechano et al., "Controlling individual agents in high-density crowd simulation," Proceedings of the 2007 ACM SIGGRAPH/ Eurographics symposium on Computer animation. Eurographics Association, 2007. APA.
Rivers et al., "FastLSM: Fast Lattice Shape Matching for Robust Real-Time Deformation," ACM Transactions on Graphics, vol. 26, No. 3, Article 82, Publication date: Jul. 2007, 6 pgs.
Ruiz, "Reducing memory requirements for diverse animated crowds," Proceedings of Motion on Games. ACM, 2013.
Rungjiratananon et al., "Elastic Rod Simulation by Chain Shape Matching with Twisting Effect," SIGGRAPH Asia 2010, Seoul, South Korea, Dec. 15-18, 2010, ISBN 978-1-4503-0439-9/10/0012, 2 pgs.

Seo et al., "Compression and Direct Manipulation of Complex Blendshape Models," In ACM Transactions on Graphics (TOG) Dec. 12, 2011 (vol. 30, No. 6, p. 164). ACM. (Year: 2011), 10 pgs.
Sifakis, Eftychios D., "FEM Simulations of 3D Deformable Solids: A Practioner's Guide to Theory, Discretization and Model Reduction. Part One: The Classical FEM Method and Discretization Methodology," SIGGRAPH 2012 Course, Version 1.0 [Jul. 10, 2012], 50 pgs.
Starke et al., "Local motion phases for learning multi-contact character movements," ACM Transactions on Graphics (TOG). Jul. 8, 2020;39(4):54-1 (Year: 2020).
Stomakhin et al., "Energetically Consistent Invertible Elasticity," Eurographics/ACM SIGRAPH Symposium on Computer Animation (2012), 9 pgs.
Thalmann et al., "Crowd rendering," Crowd Simulation. Springer London, 2013. 195-227.
Thalmann et al., "Modeling of Populations," Crowd Simulation. Springer London, 2013. 31-80.
Treuille, A. et al., "Near-optimal Character Animation with Continuous Control," University of Washington, 2007, 7 pgs.
Ulicny et al., "Crowd simulation for interactive virtual environments and VR training systems," Computer Animation and Simulation 2001 (2001 ): 163-170.
Vaillant et al., "Implicit Skinning: Real-Time Skin Deformation with Contact Modeling," (2013) ACM Transactions on Graphics, vol. 32 (n° 4). pp. 1-11. ISSN 0730-0301, 12 pgs.
Vigueras et al. "A distributed visualization system for crowd simulations," Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.
Zhang et al., "Mode-adaptive neural networks for quadruped motion control. ACM Transactions on Graphics (TOG)," Jul. 30, 2018;37(4): 1-1. (Year: 2018).
Min et al., "Interactive Generation of Human Animation with Deformable Motion Models" ACM Transactions on Graphics, vol. 29, Issue 1, (Year: 2009), 12 pgs.
Shikai, "Method, Device, Equipment and Storage for generating walking animation of Virtual Character", English Translation of CN 202111374361.9, Nov. 19, 2021 (Year: 2021).
Yamane, et al., "Natural Motion Animation through Constraining and Deconstraining at Will" (Year: 2003).

* cited by examiner

PREDICTING FACIAL EXPRESSIONS USING CHARACTER MOTION STATES

BACKGROUND

Field

Some embodiments of the present disclosure are directed to systems and methods for developing electronic games for a gaming system and enhancing game development tools.

Description

Video games have increased in popularity and complexity in recent years. As the popularity and complexity of video games has increased, many players desire the characters associated with the video game to be of an increased quality. This is particularly true in video games where the character mimics a likeness of the player. In order to design a lifelike character, the character may have a variable facial expression such that the facial expression of the character can change as particular stimuli are encountered. A character may be animated to emote, and in so doing, the character's face may express disparate feelings. For example, a character may express feelings of confusion, sadness, apprehension, fear, and so on.

The use of a variable facial expression can cause difficulties when editing and/or designing the character. Generally, video game developers are required to manipulate a three-dimensional model of a character's face to arrive at each emotion. As an example, a video game developer may modify the character's face to appear happy. The video game developer may utilize software to create the three-dimensional model of the character's face and then adjust the three-dimensional model to conform to a particular emotion. As each character's range of facial expressions may be required to be modeled separately, modeling the facial expressions can require a large amount of work. For example, a game developer may experience delays and/or difficulties when identifying particular facial expressions to map to characters at different stages of the video game. As the number of facial expressions mapped to a particular character may be large, the delays associated with such a mapping may be extensive.

SUMMARY OF EMBODIMENTS

The systems, methods, and devices of this disclosure each have several innovative aspects, no single one of which is solely responsible for the all of the desirable attributes disclosed herein.

One embodiment discloses a system. The system can include one or more processors and a computer-readable storage medium including machine-readable instructions that, when executed by the one or more processors, may cause the one or more processors to execute a game development application. The game development application may receive input identifying a character pose of a virtual character. The pose may be defined by location information of a plurality of joints of a character skeleton. The game development application may apply a machine learning model to the input. The machine learning model may generate a facial pose of the virtual character based at least in part on the character pose of the virtual character. The game development application may apply the machine learning model to the input to identify a latent representation of the input. Further, the game development application may apply the machine learning model to the input to generate one or more facial expression parameters of the facial pose of the virtual character based at least in part on the latent representation of the input. Further, the game development application may output the one or more facial expression parameters of the facial pose of the virtual character.

In various embodiments, the input may be a first input. The game development application may receive second input identifying at least one of image data associated with the character, audio data associated with the character, player data of a player associated with the character, a context of a video game associated with character, a genre of the video game associated with the character, or one or more labels associated with the character. To apply the machine learning model to the input, the game development application may apply the machine learning model to the first input and the second input. The latent representation of the input may be a latent representation of the first input and the second input.

In various embodiments, the input may include at least one of motion capture data associated with a motion capture sensor or key-frame data.

In various embodiments, the machine learning model may be a first machine learning model, the latent representation of the input may be a first latent representation of the input, the one or more facial expression parameters may be one or more first facial expression parameters, and the virtual character may be a first virtual character. The game development application may apply a second machine learning model to the input. The second machine learning model may generate a facial pose of a second virtual character based at least in part on the character pose of the first virtual character. The game development application may apply the second machine learning model to the input to identify a second latent representation of the input. Further, the game development application may apply the second machine learning model to the input to generate one or more second facial expression parameters of the facial pose of the second virtual character based at least in part on the second latent representation of the input. Further, the game development application may output the one or more second facial expression parameters of the facial pose of the second virtual character.

In various embodiments, the one or more facial expression parameters of the facial pose of the virtual character may include one or more labels. Each of the one or more facial expression parameters of the facial pose of the virtual character may identify an emotion of the virtual character and may be associated with a particular weight.

In various embodiments, the machine learning model may be a first machine learning model, the latent representation of the input may be a first latent representation of the input, the one or more facial expression parameters may be one or more first facial expression parameters, and the virtual character may be a first virtual character. The game development application may apply a second machine learning model to the input. The second machine learning model may generate a facial pose of a second virtual character based at least in part on the character pose of the first virtual character. The game development application may apply the second machine learning model to the input to identify a second latent representation of the input. Further, the game development application may apply the second machine learning model to the input to generate one or more second facial expression parameters of the facial pose of the second virtual character based at least in part on the second latent representation of the input. Further, the game development application may output the one or more second facial expression parameters of the facial pose of the second virtual character. Further, the game development application may apply a third machine learning model to the one or more first facial expression parameters of the facial pose of the first virtual character and the one or more second facial expression parameters of the facial pose of the second virtual character. The third machine learning model may generate a facial expression of the first virtual character based at least in part on the one or more first facial expression parameters of the facial pose of the first virtual character and the one or more second facial expression parameters of the facial pose of the second virtual character. The game development application may apply the third machine learning model to the one or more first facial expression parameters of the facial pose of the first virtual character and the one or more second facial expression parameters of the facial pose of the second virtual character to identify a third latent representation of the one or more first facial expression parameters of the facial pose of the first virtual character and the one or more second facial expression parameters of the facial pose of the second virtual character. Further, the game development application may apply the third machine learning model to the one or more first facial expression parameters of the facial pose of the first virtual character and the one or more second facial expression parameters of the facial pose of the second virtual character to generate a facial expression of the first virtual character based at least in part on the third latent representation of the one or more first facial expression parameters of the facial pose of the first virtual character and the one or more second facial expression parameters of the facial pose of the second virtual character. Further, the game development application may output the facial expression of the first character.

In various embodiments, the machine learning model may be a first machine learning model, the latent representation of the input may be a first latent representation of the input, the one or more facial expression parameters may be one or more first facial expression parameters, and the character may be a first character. The game development application may apply a second machine learning model to the input. The second machine learning model may generate a facial pose of a second virtual character based at least in part on the character pose of the first virtual character. The game development application may apply the second machine learning model to the input to identify a second latent representation of the input. Further, the game development application may apply the second machine learning model to the input to generate one or more second facial expression parameters of the facial pose of the second virtual character based at least in part on the second latent representation of the input. Further, the game development application may output the one or more second facial expression parameters of the facial pose of the second virtual character. The game development application may apply a third machine learning model to the one or more first facial expression parameters of the facial pose of the first virtual character and the one or more second facial expression parameters of the facial pose of the second virtual character. The third machine learning model may generate a facial expression of the first virtual character based at least in part on the one or more first facial expression parameters of the facial pose of the first virtual character and the one or more second facial expression parameters of the facial pose of the second virtual character. The game development application may apply the third machine learning model to the one or more first facial expression parameters of the facial pose of the first virtual character and the one or more second facial expression parameters of the facial pose of the second virtual character to identify a third latent representation of the one or more first facial expression parameters of the facial pose of the first virtual character and a fourth latent representation of the one or more second facial expression parameters of the facial pose of the second virtual character. Further, the game development application may apply the third machine learning model to the one or more first facial expression parameters of the facial pose of the first virtual character and the one or more second facial expression parameters of the facial pose of the second virtual character to generate a first facial expression of the first virtual character based at least in part on the third latent representation of the one or more first facial expression parameters of the facial pose of the first virtual character and a second facial expression of the second virtual character based at least in part on the fourth latent representation of the one or more second facial expression parameters of the facial pose of the second virtual character. The game development application may determine the first facial expression and the second facial expression are within a particular range of facial expressions. The game development application may output the first facial expression of the first virtual character and the second facial expression of the second virtual character based at least in part on determining the first facial expression and the second facial expression are within the particular range of facial expressions.

In various embodiments, the input may be associated with a single frame or a plurality of frames.

In various embodiments, the game development application may obtain a training data set. The training data set may include a plurality of character poses and a plurality of facial expression parameters. The training data set may identify a particular character pose of the plurality of character poses and one or more expected facial expression parameters of the plurality of facial expression parameters for the particular character pose. Further, the game development application may train the machine learning model using the training data set.

In various embodiments, the machine learning model may be a first machine learning model. The game development application may apply a second machine learning model to the one or more facial expression parameters of the facial pose of the virtual character. The second machine learning model may generate a facial expression of the virtual character based at least in part on the one or more facial expression parameters of the facial pose of the virtual character. The game development application may apply the second machine learning model to the one or more facial expression parameters of the facial pose of the virtual character to identify a latent representation of the one or more facial expression parameters of the facial pose of the virtual character. Further, the game development application may apply the second machine learning model to the one or more facial expression parameters of the facial pose of the virtual character to generate a facial expression of the virtual character based at least in part on the latent representation of the one or more facial expression parameters of the facial pose of the virtual character. Further, the game development application may output the facial expression of the virtual character. The facial expression may include at least one of one or more morph meshes, one or more displacement maps, one or more shader parameters, one or more muscle sets, or one or more labels.

In various embodiments, the machine learning model may be a first machine learning model. The game development application may apply a second machine learning model to the one or more facial expression parameters of the facial pose of the virtual character. The second machine learning model may generate a facial expression of the virtual character based at least in part on the one or more facial expression parameters of the facial pose of the virtual character. The game development application may apply the second machine learning model to the one or more facial expression parameters of the facial pose of the virtual character to identify a latent representation of the one or more facial expression parameters of the facial pose of the virtual character. Further, the game development application may apply the second machine learning model to the one or more facial expression parameters of the facial pose of the virtual character to generate a facial expression of the virtual character and a probability associated with the facial expression of the virtual character based at least in part on the latent representation of the one or more facial expression parameters of the facial pose of the virtual character. Further, the game development application may output the facial expression of the virtual character and the probability associated with the facial expression of the virtual character.

In various embodiments, the game development application may generate an output by combining the character pose of the virtual character and the one or more facial expression parameters of the facial pose of the virtual character. Further, the game development application may provide the output to a computing device.

In various embodiments, to output the one or more facial expression parameters of the facial pose of the virtual character, the game development application may indicate a recommended facial expression associated with the character pose of the virtual character based at least in part on the one or more facial expression parameters of the facial pose of the virtual character.

Another embodiment discloses a computer-implemented method as implemented by an interactive computing system configured with specific computer-executable instructions during runtime of a game development application. The method may include receiving input identifying a character pose of a virtual character. The character pose may be defined by location information of a plurality of joints of a character skeleton. The method may further include applying a machine learning model to the input. The machine learning model may generate a facial pose of the virtual character based at least in part on the character pose of the virtual character. Applying the machine learning model to the input may include identifying a latent representation of the input. Applying the machine learning model to the input may further include generating one or more facial expression parameters of the facial pose of the virtual character based at least in part on the latent representation of the input. The method may further include outputting the one or more facial expression parameters of the facial pose of the virtual character.

In various embodiments, the machine learning model may be a first machine learning model. The method may further include applying a second machine learning model to the one or more facial expression parameters of the facial pose of the virtual character. The second machine learning model may generate a facial expression of the virtual character based at least in part on the one or more facial expression parameters of the facial pose of the virtual character. Applying the second machine learning model to the one or more facial expression parameters of the facial pose of the virtual character may include identifying a latent representation of the one or more facial expression parameters of the facial pose of the virtual character. Applying the second machine learning model to the one or more facial expression parameters of the facial pose of the virtual character may further include generating the facial expression of the virtual character based at least in part on the latent representation of the one or more facial expression parameters of the facial pose of the virtual character. The method may further include outputting the facial expression of the virtual character.

In various embodiments, the method may include receiving second input identifying at least one of image data associated with the virtual character, audio data associated with the virtual character, player data of a player associated with the virtual character, a context of a video game associated with virtual character, a genre of the video game associated with the virtual character, or one or more labels associated with the virtual character. Applying the machine learning model to the input may include applying the machine learning model to the first input and the second input. The latent representation of the input may be a latent representation of the first input and the second input.

In various embodiments, the method may include generating an output by combining the character pose of the virtual character and the one or more facial expression parameters of the facial pose of the virtual character. The method may further include providing the output to a computing device.

Another embodiment discloses a non-transitory computer-readable medium storing computer-executable instructions that, when executed by one or more computing devices, may configure the one or more computing devices to execute a game development application. The game development application may receive input identifying a character pose of a virtual character. The character pose may be defined by location information of a plurality of joints of a character skeleton. Further, the game development application may apply a machine learning model to the input. The the machine learning model may generate a facial pose of the virtual character based at least in part on the character pose of the virtual character. The game development application may apply the machine learning model to the input to identify a latent representation of the input. Further, the game development application may apply the machine learning model to the input to generate one or more facial expression parameters of the facial pose of the virtual character based at least in part on the latent representation of the input. Further, the game development application may output the one or more facial expression parameters of the facial pose of the virtual character.

In various embodiments, the machine learning model may be a first machine learning model. The game development application may apply a second machine learning model to the one or more facial expression parameters of the facial pose of the virtual character. The second machine learning model may generate a facial expression of the virtual character based at least in part on the one or more facial expression parameters of the facial pose of the virtual character. The game development application may apply the second machine learning model to the one or more facial expression parameters of the facial pose of the virtual character to identify a latent representation of the one or more facial expression parameters of the facial pose of the virtual character. Further, the game development application may apply the second machine learning model to the one or more facial expression parameters of the facial pose of the virtual character to generate the facial expression of the virtual character based at least in part on the latent representation of the one or more facial expression parameters of the facial pose of the virtual character. Further, the game development application may output the facial expression of the virtual character.

In various embodiments, the game development application may receive second input identifying at least one of image data associated with the virtual character, audio data associated with the virtual character, player data of a player associated with the virtual character, a context of a video game associated with virtual character, a genre of the video game associated with the virtual character, or one or more labels associated with the virtual character. To apply the machine learning model to the input, the game development application may apply the machine learning model to the first input and the second input. The latent representation of the input may be a latent representation of the first input and the second input.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

Figure 1:
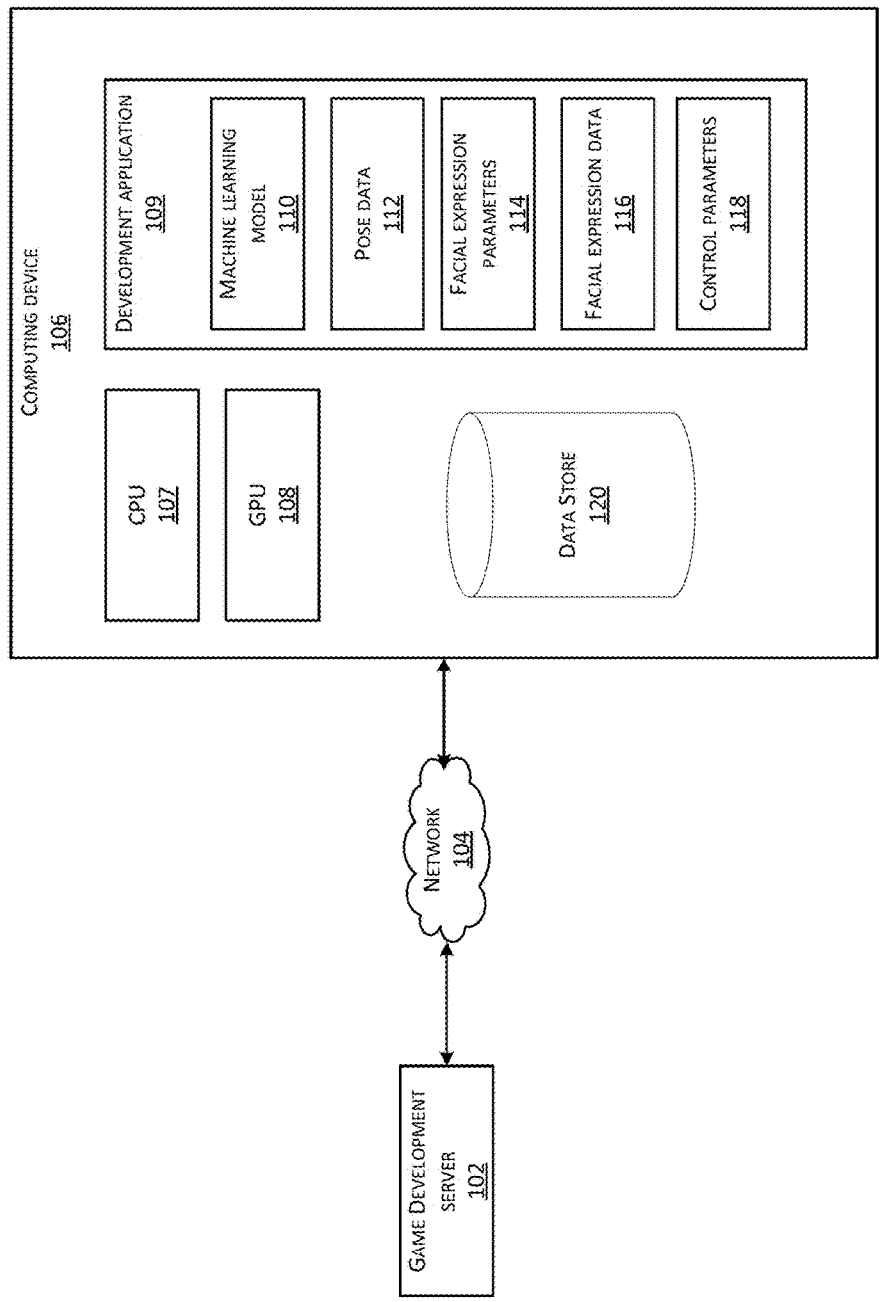
FIG. 1 illustrates an embodiment of a networked computing environment that can implement one or more processing operations.

DETAILED DESCRIPTION OF EMBODIMENTS 1.0 General Overview

Some embodiments herein are directed to an improved game development system for facilitating a game developer's interactions while updating and/or developing an electronic game in order to improve the efficiency and quality of the game development process while also improving the experience of the game developer. The electronic game described herein is an example of a game, such as a game in which one or more players utilize respective computing devices to control virtual game characters within a game world (e.g., an open game world) of the game. In some embodiments, the electronic game can be a mobile game, such as a mobile game that is implemented on a mobile computing device (e.g., a tablet, a cell phone, wearable electronics, etc.). Therefore, electronic games can be implemented on multiple computing devices and players can utilize respective computing devices in order to control virtual game characters (referred to herein as characters) and implement the game. The virtual game characters may be implemented within a virtual game world of a game application.

Developing electronic games can be complex and time-consuming. Part of developing electronic games includes developing the characters. For example, developing electronic games can include developing the characters that a particular player controls and/or the characters with which a particular player may interact (e.g., artificial intelligence characters). Further, developing the electronic games may include developing the images that are illustrated by the computing devices of the players for each character. In order to develop the images illustrated for each character, a developer, via the computing device of the developer, may define particular characteristics of each character. For example, the developer may define a body pose of the character, a facial expression of the character, etc. This definition of the characteristics of each character can occur during development processes and during any stage of development of the electronic game.

In some embodiments, a computing device implementing an electronic game, during run-time of the electronic game, may receive data (e.g., motion capture data) and define a character based on the data. For example, for a virtual reality game, the computing device may receive motion capture data identifying a player and develop images illustrated for a particular character. Further, the computing device may define the characteristics of a particular character using the received motion capture data to develop the images illustrated for the particular character.

Modern electronic games have increased dramatically in size compared to electronic games of the past. Further, the number of characters within the electronic games also continues to increase. For instance, many massively multiplayer online role-playing games (MMORPGs) include hundreds or thousands of characters. MMORPGs are not the only types of games that include a large number of characters, but regardless of the type of game, the number of characters has increased.

As video games have increased dramatically in size, the image quality required by players has also increased. Further, as electronic games have advanced, many players desire an electronic game that enables a lifelike experience closely mimicking the real world. For example, many players desire an electronic game that enables characters that have lifelike characteristics. Further, the demand for characters with lifelike body poses, lifelike facial expressions, etc. has increased. In many cases, the increase in the size of the game world has outpaced the central processing power and/or graphics processing power of many video game and computing systems.

To provide characters with lifelike characteristics, developers (e.g., animators) may define different characteristics of the character. For example, the developers may define different poses of the character. Each character may have a plurality of potential poses. Such a pose for the character may define a particular movement or motion state of the character (e.g., of the skeleton of the character). Further, the developers may define different facial expressions of the character. Similarly, each character may have a plurality of potential facial expressions. Such a facial expression may define a representation of the face of the character. The developer may, as part of the game development, determine which characteristics of the character to be displayed at different situations. For example, the developer may map particular characteristics to particular actions, particular game situations, particular stimuli, and/or a particular time. To map the particular characteristics, the developer may iteratively determine a particular set of characteristics for the character. This process may be inefficient and/or costly as the developer may compare many different characteristics before arriving at a particular set of characteristics for mapping. Further, in some situations, the developer may map an incorrect set of characteristics for the character (e.g., non-lifelike characteristics for the particular situation) based on not identifying the correct set of characteristics. For example, the developer may erroneously map a happy facial expression to a yelling character. Further, the developer may erroneously map a confused facial expression to a crying character. Therefore, mapping the characteristics to the character by the developer may be inefficient and expensive where the number of potential characteristics of the character is large.

Additionally, to provide characters with lifelike characteristics, the computing device implementing the electronic game may define characteristics for a character based on obtained data. For example, the computing device may receive motion capture data associated with a player and may define characteristics for a character associated with a player based on the motion capture data. Each character may be associated with a plurality of characteristics (e.g., potential body poses, potential facial expressions, etc.). The computing device may define the plurality of characteristics by parsing the motion capture data. In some cases, the motion capture data may be incomplete. For example, the player may be wearing a mask, a headset, etc. and the motion capture data may not accurately capture the face of the player. Therefore, the computing device may define a facial expression of the character that is not associated with the facial expression of the player and is not a lifelike characteristic. For example, the computing device may erroneously define a sad facial expression for a character associated with a happy player. This process may be inefficient and/or erroneous as the computing device implementing the electronic game may not accurately define the character.

The present disclosure generally relates to a system for implementing a game development application that allows for more efficient modification or processing of image data associated with an electronic game. While the present disclosure is described with respect to electronic games, it will be understood that the techniques described herein may be applied generally to character development. For example, animated content (e.g., television shows, movies, etc.) may employ the techniques described herein. Further, the techniques described herein may be applied generally to game implementation (e.g., in real-time).

In order to modify developer game data, developer computing devices (e.g., designer computing devices) may be in communication with a local or remote data store. For example, the developer computing devices can modify the developer game data to modify how the game is implemented. The developer computing devices can generate one or more service calls that modify the developer game data within the database. For example, the developer computing device can modify, add, or delete developer game data from the database (e.g., add, remove, modify character data, or otherwise modify the game application information). The developer computing devices can interact with the database to modify the developer game data. Based on the modified developer game data, the developer game data read by the game server may be adjusted. Therefore, the developer computing devices can adjust the game that is implemented by the computing devices.

Typically, such developer computing devices may provide input (e.g., game developer data) to the data store that defines how a given character should be defined based on characteristics of the character. In some embodiments, computing devices implementing the electronic game (e.g., a virtual reality game) can receive data (e.g., motion capture data) and parse the data to identify characteristics of the character. Further, the computing device can generate input that defines how the character should be defined based on the characteristics of the character. Existing gaming systems may receive the input and define a character using the characteristics. This can result in an unwieldy and exhaustive process as the characteristics of each character may be individually defined. The developer computing devices may determine a character pose and define movement, configuration, etc. of a body of the character using the character pose. Further, the developer computing devices may determine a facial pose and define a facial expression (e.g., movement, configuration, etc.) of a face of the character. As the movement, configuration, etc. of the body and the facial expression of the face of the character may be independently defined using the character pose and the facial pose, defining the characteristics of each character may be inefficient.

The developer computing devices and/or the computing devices implementing the electronic game may generate incorrect inputs (e.g., inputs that define non-lifelike characteristics of the character). For example, the developer computing devices and/or the computing devices implementing the electronic game may generate incorrect inputs when the inputs are based on incorrect and/or incomplete data (e.g., when the motion capture data corresponds to a body of a player, but does not correspond to a face of player). Therefore, it may be disadvantageous for the developer computing devices and/or the computing devices implementing the electronic game to arbitrarily generate the input (e.g., without a separate system indicating a recommended set of characteristics).

The disclosed game development system and/or the disclosed system for implementing the electronic game address these challenges, among others, by enabling facial expression parameters of a facial pose of a character to be identified based on a character pose of the character. Further, the system receives character data identifying the character. For example, the character data may be motion capture data, key-frame data, or any other data that defines a pose of character. The system may further obtain and/or generate character pose data associated with the character data identifying the character pose of the character. The system may define a character pose of the character using information (e.g., location information, position information, orientation information, etc.) for the joints and/or bones of a skeleton of the character excluding the joints and/or bones of a face of the character. For example, the character pose may be a pose of the body of a character, a pose of the skeleton of a character, a pose of the silhouette of a character, etc. The system utilizes a machine learning model that is trained on a plurality of facial expression parameters and pose data (e.g., a plurality of known mappings between facial expression parameters and particular poses). The machine learning model may identify a latent representation of the input. Based on the latent representation of the input, the machine learning model can generate facial expression parameters of the facial pose of the character based on the character pose. Further, the system can output the one or more facial expression parameters of the character (e.g., as recommended facial expression parameters of the character). In some embodiments, the system can provide the one or more facial expression parameters to an additional machine learning model. The machine learning model can receive the one or more facial expression parameters and predict a facial expression of the character based on the one or more facial expression parameters of the character. In other embodiments, the machine learning model can predict the facial expression of the character. Therefore, the system, using input identifying the pose of the character, can generate facial expression parameters and/or a facial expression for the character. The system may define a facial expression of the character using the facial expression parameters identifying information (e.g., location information, position information, orientation information, etc.) for the joints and/or bones of a face of the character. For example, the facial expression may be a rendering of the face of the character based on the facial expression parameters.

It will be understood that, while this disclosure references a particular system (e.g., a game development system) for enabling facial expression parameters for a character to be identified based on a pose of the character, the disclosed techniques may be implemented by another system (including a system implementing the electronic game, as discussed above).

For purposes of this disclosure, the term "player," "user," and "customer" may each refer to a person that is operating a computing device in order to control the operation of a game application. For purpose of this disclosure, the term "character" can refer to a virtual avatar or virtual character that a user can control within a game application. The character can be a person, vehicle, object, and/or any virtual entity within the game application.

2.0 Overview of Video Game Environment

FIG. 1 illustrates an embodiment of a computing environment 100 for implementing a game development system on a computing device 106. The environment 100 includes a network 104, a game development server 102, and a computing device 106, which includes hardware processors (e.g., a central processing unit ("CPU") 107 and/or a graphical processing unit ("GPU") processing unit 108). Further, the hardware processors can implement a game development application 109. The game development application 109 can implement a machine learning model 110, pose data 112, facial expression parameters 114, and facial expression data 116 to predict a facial expression of a character. To simplify discussion and not to limit the present disclosure, FIG. 1 illustrates only one computing device 106 and one game server 102, though multiple systems may be used. The computing device 106 may communicate via a network 104 with the game server 102. Although only one network 104 is illustrated, multiple distinct and/or distributed networks 104 may exist. Although not shown in FIG. 1, it will be understood that the computing environment 100 may include more, less, or different components.

2.1 Network

As illustrated in FIG. 1, the computing device 106 and the game server 102 may communicate over the network 104. The network 104 can include any type of communication network. For example, the network 104 can include one or more of a wide area network (WAN), a local area network (LAN), a cellular network, an ad hoc network, a satellite network, a wired network, a wireless network, and so forth. In some embodiments, the network 104 can include the Internet. In the illustrated embodiment, the network 104 is the Internet. Protocols and components for communicating via the Internet or any of the other aforementioned types of communication networks are known to those skilled in the art of computer communications and thus, need not be described in more detail herein.

2.2 Game Development Server

The computing device 106 may be in communication with a game development server 102. The game development server 102 can be configured to host game development resources for use by developers in the game development process. For example, the game development server(s) 102 may be configured to include one or more application host systems and a data store. The game development server 102 may enable multiple users or computing systems to access a portion of game development resources for the game application.

2.3 Data Store

The data store 120 may be a collection of data (e.g., game data, game state data, and/or developer game data associated with the game). For example, the data store 120 can store developer game data and/or player game data corresponding to development and execution of a game application. The developer computing devices can modify the developer game data and/or the player game data stored in the data store 120 and based on the modified developer game data and/or player game data, the game server 102 may adjust how the game is run.

The data store 120 can store game data (e.g., developer game data and player game data) including game rules, poses/paths, environmental settings, environmental objects, constraints, skeleton models, route information, and/or other game application information. At least a portion of the game data can be stored in the data store 120. In some embodiments, a portion of the game data may be received and/or stored remotely. Further, at least a portion of the game data may be received during runtime of the game application.

The data store 120 can further store game state data including a game state, character states, environment states, scene object storage, route information, and/or other information associated with a runtime state of the game application. For example, the game state data can identify the state of the game application at a specific point in time, such as a character position, character operation, character action, game level attributes, and other information contributing to a state of the game application. The game state data can include dynamic state data that continually changes, such as character movement positions, and/or static state data, such as the identification of a game level within the game.

2.4 Computing Device

The computing device 106 may be a developer computing device. Further, the computing device 106 may execute a game development application in order to execute game development functions associated with development of a game application. For example, the game development application may provide functions for processing game data for the virtual game environment. In some embodiments, the computing device 106 may be a user computing device for implementing an electronic game. For example, the techniques described herein may be performed during in-game (e.g., real time) gameplay of the electronic game. For example, a player may desire that a character within the electronic game be based on the player. In this example, the player may provide video footage of the player for the character to mimic. Therefore, the computing device implementing the electronic game may generate a character based on the video footage of the player.

The computing device 106 may include hardware and software components for establishing communications over communication network (e.g., the network 104). For example, the computing device 106 may be equipped with networking equipment and network software applications (for example, a web browser) that facilitate communications via one or more networks (for example, the Internet or an intranet). The computing device 106 may have varied local computing resources such as CPU 107 and architectures, memory, mass storage, GPU 108, communication network availability and bandwidth, and so forth. Further, the computing device 106 may include any type of computing system. For example, the computing device 106 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few.

The computing device 106 may implement the game development application 109 in order to enable a developer to manage the game by performing processing operations on the game data for the game. For example, the computing device 106 may implement the game development application 109 in order to modify how a character is represented to a user (e.g., by defining characteristics of a particular character.) The computing device 106 may include one or more input devices that are configured to receive developer input. For example, the developer can interact with the input devices of the computing device 106 (e.g., a touch sensor, a mouse, a keypad, etc.) in order to generate input (e.g., pose data) for a game development application 109 being implemented by the computing device 106. The computing device 106 may detect the user input as a movement with respect to the computing device 106 that can include a spatial component, a directional component, an intensity component, or any other magnitude or component. The user input may be detected relative to a first space (e.g., a screen space). For example, the component information of the user input may be relative to the screen space of the computing device 106. Using the user input, the computing device 106 (by implementing the game development application 109) can identify character data of a character. Further, the computing device 106 can identify pose data of the character as input based on the character data.

Typically, the developer computing system is capable of executing a game application, such as a video game, that may be stored and/or executed in a distributed environment. For example, the user computing system may execute a portion of a game and the interactive computing system, or an application host system of the interactive computing system, may execute another portion of the game. For instance, the game may be a massively multiplayer online role-playing game (MMORPG) that includes a client portion executed by the user computing system and a server portion executed by one or more application host systems. For the present discussion, the application can include a distributed application or an application that includes a portion that executes on the user computing system and a portion that executes on at least one of the application host systems. The user computing system may execute a host application. The host application can be loaded into memory on the user computing system and can act as an interface or hub for one or more game applications that interfaces with the application host system.

As used herein, a virtual environment may comprise a simulated space (e.g., a physical space) instanced on a server (e.g., server) that is accessible by a client (e.g., client) located remotely from the server, to format a view of the virtual environment for display to a user of the client. The simulated space may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual environment, and/or surface features of a surface or objects that are "native" to the virtual environment.

2.5 Processing Game Data

The game development application 109 can utilize the hardware processors (e.g., CPU 107 and GPU 108) and/or remote computing resources (e.g., game development server 102) to process game data using various functions within the game development application 109. For example, the game development application 109 may process game data based on one or more requests received from developer computing devices. Further, the one or more requests may include a request to modify characteristics of a character. In order to process the game data, the game development application 109 can utilize a machine learning model 110, pose data 112, facial expression parameters 114, and facial expression data 116. The game development application 109 can implement a process to generate facial expression parameters 114 based on pose data 112.

2.5.1 Pose Data

The game development application 109 can receive, as input, game data that may include pose data 112. The pose data 112 may identify distinct poses of the characters. Further, the distinct poses of the character may be blended together to generate an action. Each particular pose may represent a discrete sample of the action to be performed by the character. For example, for a running action, each pose may represent a snapshot of the character running.

The pose data 112 may be associated with motion capture data (e.g., data capturing the movement of objects and/or persons). For example, the pose data 112 may be associated with motion capture data from one or more motion capture sensors. The computing device 106 (or a separate computing system) may obtain the motion capture data and identify the pose data 112 from the motion capture data. For example, a person (e.g., a player, a model, etc.) may be located in a motion capture studio with one or more motion capture sensors that obtain motion capture data associated with that person. The motion capture data may identify different movements, transitions, etc. of different portions of the person. In another example, the electronic game may be a virtual reality game or an augment reality game. Further, a computing device associated with a player may obtain motion capture data of the player for the electronic game. To obtain the pose data 112, the motion capture data may be translated onto a skeleton of a character and pose data 112 may be identified. Therefore, the computing device 106 may identify a pose of the person based on the motion capture data.

Further, the pose data 112 may be associated with animation data, such as key-frame animation. For example, the pose data 112 may be associated with key-frame data from another developer computing device (e.g., an animator computing device associated with an animator). Key-frame data may be image data identifying a particular character. The key-frame data may include pose data 112. of a particular character. The game development application 109 may identify specific pose data of the character based on the keyframe data.

The pose data 112 may be associated with any data representing a player, a character, an a person from whom motion data is captured, an object, etc. Further, the pose data 112 may be associated with any data identifying a particular pose (e.g., a particular orientation, position, location, movement, rotation, velocity, etc. associated with a particular portion of a player, a character, a person, etc.) of a player, a character, a person, an object, etc. For example, the pose data 112 may identify a pose of a mannequin.

The pose data 112 may identify particular observable features of a particular pose. For example, the observable features of a particular pose may include positions of locations on a real-life person (e.g., three-dimensional coordinates). The positions of locations on the real-life person may be joints and may represent rotatable portions of the real-life person (e.g., knees, wrists, neck, etc.). Further, the observable features of a particular pose may include movement information (e.g., velocity information). For example, the observable features of a particular pose may include velocity information for a particular joint on the real-life person.

2.5.2 Control Parameters

The game development application 109 can receive, as input, control parameters 118. In some embodiments, the game development application 109 may not receive the control parameters 118. The control parameters 118 may include one or more parameters to adjust how facial expression parameters 114 are identified based on the pose data 112. The control parameters 118 may be data associated with the electronic game, the player, the location, the computing device 106, or any other data. For example, the control parameters 118 may be data associated with a gaming style of a player (e.g., aggressive, timid, angry, strategic, etc.), a characteristic and/or demographic of a player (e.g., an age of the player, a gender of the player, a location of the player, etc.), or any other labels associated with the player. Further, the control parameters 118 may be data associated with a genre of the electronic game (e.g., a fighting game, a sports game, an adventure game, etc.) or a context of the electronic game (e.g., the scene being displayed to the player is a sad scene, the scene being displayed is a fight scene, etc.). Further, the control parameters 118 may be audio data and/or video data associated with the player (e.g., an audio or visual recording associated with the player).

2.5.3 Machine Learning Model

The game development application 109 can implement a machine learning model 110. Further, the game development application 109 can implement the machine learning model 110 by applying the pose data 112 and/or the control parameters 118 as input to the machine learning model 110. The machine learning model 110 may include any one or more of a convolutional neural network, a recurrent neural network, a multilayer perception, an autoencoder, a variational autoencoder, a transformer, or any other type of neural network. For example, the machine learning model 110 may include an unsupervised artificial neural network (e.g., an autoencoder). In some embodiments, the game development application 109 can implement the machine learning model 110 as a part of a pipeline for identifying particular facial expression parameters 114.

The machine learning model 110 may be trained to generate particular facial expression parameters 114 for a character based on pose data 112 associated with the character. The machine learning model 110 may be trained using a set of pose data and a set of facial expression parameters. The machine learning model 110 may learn mappings between each pose of the set of pose data and a particular subset of the set of facial expression parameters. Based on the training of the machine learning model 110, the machine learning model 110 may generate particular facial expression parameters for a particular input pose.

Further, the machine learning model 110 may learn a latent feature space of a lower-dimension than the input features (e.g., the pose data). The latent feature space may include any number of latent variables (e.g., 7, 9, 12, etc.). Further, the latent feature space may be continuous or substantially continuous and each latent variable may be defined as a distribution within the latent feature space. Therefore, the machine learning model 110 can encode the input features within the latent feature space. Further, the machine learning model 110 can identify particular facial expression parameters 114 based on the encoded input features within the latent feature space.

2.5.4 Facial Expression Parameters

The game development application 109 can receive, as input, game data that may include pose data 112. Based on the pose data 112 and/or the control parameters 118, the game development application 109 can apply the machine learning model 110 to identify the facial expression parameters 114. The facial expression parameters 114 may identify one or more labels (e.g., tags, categorical features, etc.) associated with a particular facial expression. Further, the facial expression parameters 114 may identify a particular state or emotion of the character. For example, the facial expression parameters 114 may identify the character as joyful, happy, sad, angry, confused, delirious, hungry, annoyed, bewildered, bemused, etc. It will be understood that the facial expression parameters 114 may identify any state or emotion of the character.

In some embodiments, the facial expression parameters 114 may identify multiple states or emotions of the character. For example, the facial expression parameters 114 may identify that the character is 80% puzzled, 10% sad, and 10% happy. Further, the facial expression parameters 114 may identify a particular probability for each state or emotion of the character. For example, the facial expression parameters 114 may identify an 80% probability that the character is puzzled, a 10% probability that the character is sad, and a 10% probability that the character is happy.

2.5.5 Facial Expressions

Based on the facial expression parameters 114, the game development application 109 can identify the facial expression data 116 of the character. The facial expression data 116 may identify factors associated with a particular facial expression of the character. For example, a plurality of factors may be used to generate particular facial expression data 116. Further, the factors for the generation of the facial expression data 116 may include a mesh corresponding to the facial expression of the character (e.g., a morph mesh), a muscle set corresponding to the facial expression of the character (e.g., particular muscles associated with the character), a displacement map corresponding to the facial expression of the character (e.g., a displacement of particular features (e.g., muscles, portions, etc.) of the face of the character), a shader parameter corresponding to the facial expression of the character (e.g., values corresponding to particular pixels based on a lighting input associated with the particular pixels), textures corresponding to the facial expression of the character (e.g., one or more texture maps), or any other factor for the generation of the facial expression.

The facial expression data 116 may correspond to one or more values. For example, the facial expression data 116 may store a plurality of UV coordinates to identify the mesh corresponding to the facial expression data 116 of the character. Further, the facial expression data 116 may store a plurality of values indicating particular muscles or an activation of particular muscles. In some embodiments, the facial expression data 116 may be a vector of values based on the pose data 112 and/or the control parameters 118.

3.0 Overview of Pose Data

To generate facial expression parameters and/or a facial expression associated with a particular character, the game development application 109 can receive character data (e.g., character data identifying a particular character, a particular player, etc.). Further, the game development application 109 can process the character data and identify a skeleton associated with the character. Based on the skeleton associated with the character data, the game development application 109 can identify a particular pose associated with the character data. The character data may be received and translated into the pose data. For example, character data in the form of image data associated with a player may be obtained and, based on the image data, pose data associated with the player may be obtained. Accordingly, the system can identify the pose data associated with particular character data.

Figure 2:
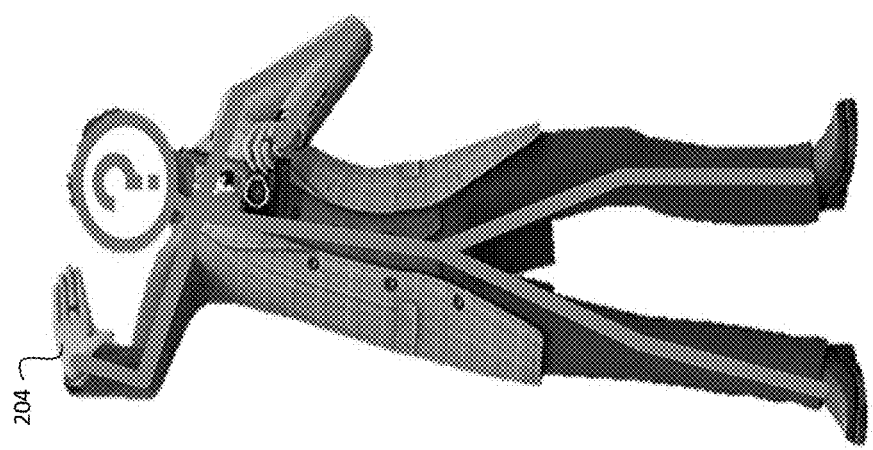
FIG. 2 is a pictorial diagram depicting a character and a skeleton of the character.
Figure 2:
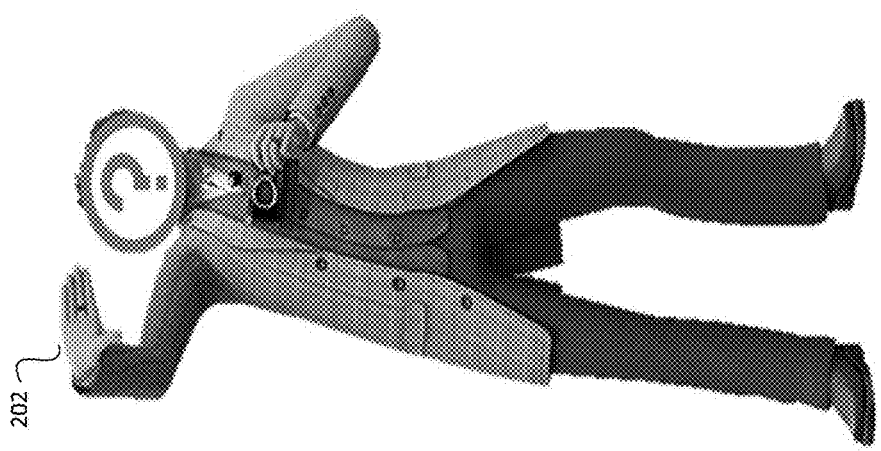

FIG. 2 is a pictorial diagram 200 depicting character data 202 and pose data 204 based on the character data. The diagram 200 depicts character data 202 of a specific type (e.g., motion capture date, key-frame data, etc.) for display within a virtual environment (e.g., a game environment) of a game application. Further, the diagram 200 may depict how character data 202 is received and processed to identify pose data 204 associated with the character data 202. Based on the character data 202, the pose data 204 associated with a particular character may be identified.

The character data 202 may be identified by and/or obtained from a computing device (e.g., a player computing device, a developer computing device, etc.). For example, the character data 202 may be obtained as image data and/or video data. Further, the computing device may process the image data and/or video data to generate the character data 202 (e.g., a character model based on the image data and/or the video data). Further, the character data 202 may be identified within an image (e.g., the character data 202 may be a subset or portion of the image). The computing device may detect and/or generate the character data 202. In some embodiments, the character data 202 may identify particular locations for particular positions of a body. Further, the character data 202 may identify particular movements associated with particular portions of the body (e.g., a spatial component, a directional component, an intensity component, or any other magnitude or component). Therefore, the character data 202 may be obtained from a computing device.

The game development application 109 (executing on the computing device 106, or another computing device, such as the game development server 102) may receive the character data 202. Further, the game development application 109 may identify the position, orientation, location, velocity, etc. of joints associated with the character data 202. For example, the character data 202 may identify a character model and the game development application 109 may identify the position, orientation, location, velocity, etc. of joints (e.g., knees, ankles, neck, elbows, wrists, fingers, etc.) associated with the character of the character model. Further, the game development application 109 may identify a particular position and orientation of the elbows and knees of the character using the character data 202.

Using the identified position, orientation, location, velocity, etc. of the joints associated with the character, the game development application 109 may identify particular pose data 204 associated with the character data 202. For example, the particular pose data 204 associated with the character data 202 may indicate a jumping pose, a sprinting pose, an arguing pose, a yelling pose, or any other pose associated with the character. The game development application 109 may identify the pose data 204 based on the joints (and the information associated with the joints) of the character. In some embodiments, the pose data 204 may include the position, orientation, location, velocity, etc. of the joints. In other embodiments, the pose data 204 may include a label associated with a particular pose (e.g., jumping, yelling, crying, etc.).

The game development application 109 may identify the particular pose data 204 using a machine learning model. For example, the game development application 109 may provide the identified position, orientation, location, velocity, etc. of the joints associated with the character to a machine learning model. Further, the machine learning model may be trained to identify a particular pose data 204 based on information associated with the joints of the character. Therefore, the machine learning model may output the particular pose data 204.

In identifying the particular pose data 204 of the character, the game development application 109 may not identify a facial expression associated with the character. Therefore, the game development application 109 may provide the pose data 204 to identify a facial expression and/or facial expression parameters associated with the character. In some embodiments, the game development application 109 may not identify the pose data 204 from the character data 202. Instead, the game development application 109 may receive pose 204 directly as input.

In the example of FIG. 2, the character may be associated with pose data 204 that includes a first hand being raised, a second hand holding a camera, and the body being titled back. It will be understood that the pose data 204 may be associated with more, less, or different identifiers.

4.0 Generating a Facial Expression Using Pose Data

Further, to generate facial expression parameters and/or facial expression data associated with a particular character, the game development application 109 can receive the pose data 204 associated with a particular pose of a character. Further, the game development application 109 can process the pose data 204 and provide the pose data 204 as input to a machine learning model 110 in order to identify the facial expression parameters and/or the facial expression data associated with a particular character. Aspects relate to identifying the facial expression parameters and/or facial expression data associated with particular pose data 204 obtained from particular character data 202. As discussed above, character data 202 may be received and translated into the pose data 204. Further, the facial expression parameters and/or the facial expression data for a particular character may be identified based on the pose data 204. Accordingly, the system can identify facial expression parameters and/or the facial expression data associated with particular pose data 204.

Figure 3:
FIG. 3 is a pictorial diagram depicting a skeleton of a character and a generated facial expression of the character.
Figure 3:
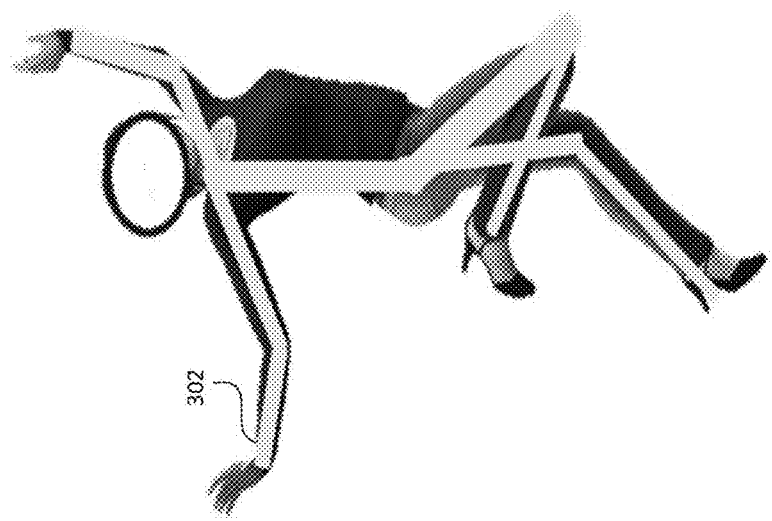

FIG. 3 is a pictorial diagram 300 depicting pose data 302 of a character and a facial expression 304 of the character. For example, the pose data 302 of the character may be obtained via an input. The game development application 109 may identify the facial expression 304 of the character for display within a virtual environment (e.g., a game environment) of a game application. Further, the diagram 300 may depict how the pose 302 and/or the pose data is received and processed to identify the facial expression parameters and/or the facial expression data associated with the character.

As discussed above, the game development application 109 may identify a particular pose 302 associated with a character. The particular pose 302 may be associated with pose data identifying the pose 302. For example, the pose data may identify the position, orientation, location, velocity, etc. of joints associated with the character.

The game development application 109 may further apply a machine learning model 110 to the pose 302 (e.g., the pose data). The game development application 109 may provide the pose 302 to the machine learning model 110 as input. Further, the machine learning model 110 may be trained to identify a facial expression parameter (e.g., a label associated with a particular facial expression) and/or a facial expression data of the character based on the pose 302. Further, the machine learning model 110 may generate a latent representation of the pose 302 (e.g., in the latent space). Further, the machine learning model 110 may generate facial expression parameters and/or facial expression data based on the latent representation of the pose 302.

In some embodiments, the machine learning model 110 may generate the facial expression parameters and one or more weights associated with each of the facial expression parameters. Further, the machine learning model 110 may provide the facial expression parameters and the associated weights to an additional machine learning model. The additional machine learning model may predict the facial expression data of the character based on the facial expression parameters. Further, the additional machine learning model may provide the facial expression as an output.

In other embodiments, the machine learning model 110 may generate the facial expression data (with or without generating the facial expression parameters). For example, the machine learning model 110 may generate the facial expression parameters and generate the facial expression data based on the facial expression parameters and/or the machine learning model 110 may generate the facial expression based on the pose 302.

Based on the facial expression associated with the character, the game development application 109 may add the facial expression to the character model. The game development application 109 may build the character model to identify the pose 302 of the character. Further, the game development application 109 may build a complete character model 304 that includes the generated facial expression for the character. In some embodiments, the game development application 109 may provide the facial expression as a recommended facial expression (e.g., for review by a developer via a user interface). Further, the game development application 109 may receive a facial expression identifier via the user interface (e.g., corresponding to the generated facial expression or a different facial expression). The game development application 109 may build the complete character model 304 based on the facial expression identifier. Therefore, the game development application 109 can build the complete character model 304 that includes a facial expression.

5.0 Example Operating Diagrams

Figure 4A:
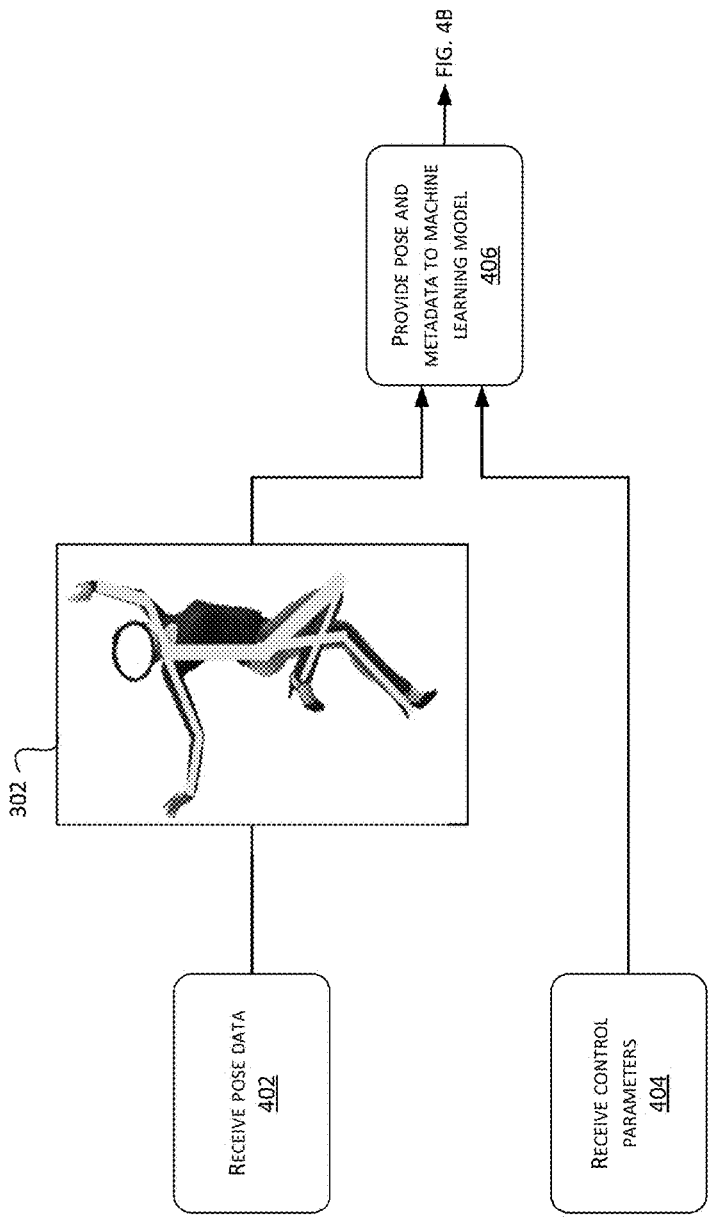
FIG. 4A depicts an embodiment of an operation diagram for providing a pose of a character to a machine learning model.
Figure 4B:
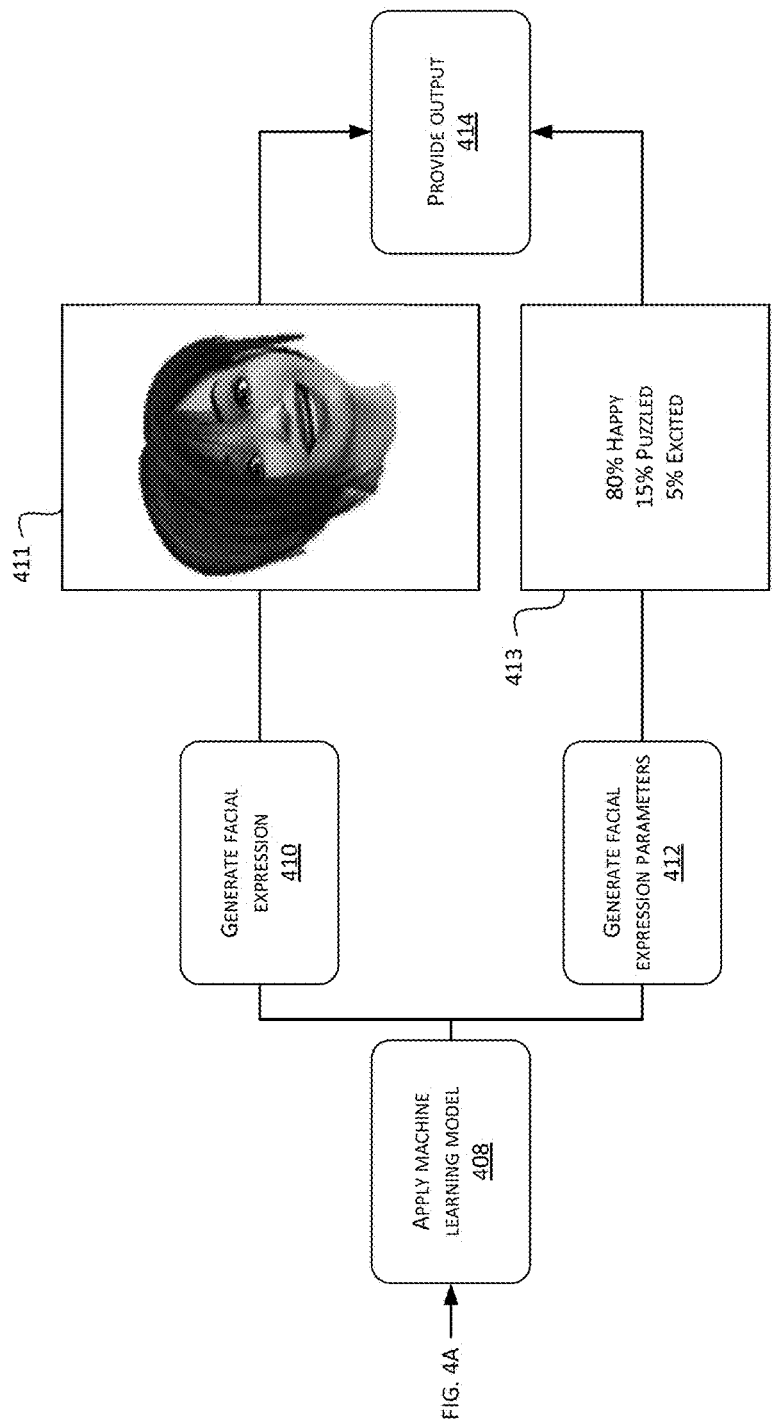
FIG. 4B depicts an embodiment of an operation diagram for generating a facial expression of a character based on the pose of the character.

FIGS. 4A and 4B are operation diagrams illustrating a data flow for generating facial expression parameters and/or facial expression data based on pose data. Specifically, FIGS. 4A and 4B are operation diagrams illustrating a data flow for identifying pose data based on received input and applying a machine learning model 110 to generate facial expression parameters and/or facial expression data based on the pose data. Any component of the computing environment 100 can facilitate the data flow for generating the facial expression parameters and/or the facial expression data based on the pose data. In the example of FIGS. 4A and 4B, the game development application 109, utilizing the machine learning model 110, facilitates the data flow.

FIG. 4A is an operation diagram 400A for obtaining pose data and control parameters and routing the pose data and the control parameters to generate a machine learning model 110. At step 402, the game development application 109 receives pose data associated with a particular pose 302 of a particular character. To receive the pose data the game development application 109 may obtain character data identifying a person, a character, an object, etc. Further, the game development application 109 can generate a character representation of the person, character, object, etc. Based on the character representation, the game development application 109 may generate a character model of the person, character, object, etc. In the example of FIG. 4A, the character model corresponds to a model of a person, however, it will be understood that different types of character data can be used. As described herein, the character data can correspond to motion capture data, image data, key-frame data, etc.

In some embodiments, the pose 302 may include particular annotations identifying the pose 302 of the character. In other embodiments, the pose 302 may not include an annotation identifying the particular pose 302.

Further, in some embodiments, the game development application 109 may receive pose data associated with a plurality of characters. For example, the game development application 109 may receive pose data associated with a first character and pose data associated with a second character. It will be understood that the game development application 109 may receive pose data associated with any number of characters. The game development application 109 may receive pose data associated with multiple characters to identify facial expressions of the multiple characters. In some embodiments, the game development application 109 may receive pose data associated with multiple characters to identify a facial expression of particular character.

At step 404, the game development application 109 receives control parameters (e.g., metadata). The control parameters may be associated with the electronic game, the player, the character, etc. Further, the control parameters may identify the electronic game. For example, the control parameters may identify a particular context of the electronic game (e.g., a particular situation within the electronic game), a genre of the electronic game, a rating of the electronic game, etc. The control parameters may also identify the player. For example, the control parameters may identify a playing style, characteristics or demographics of the player, or any other data associated with the player. Further, the control parameters may identify the character. For example, the control parameters may identify a playing style, characteristics or demographics of the character, or any other data associated with the character. Further, the control parameters may be based on video data and/or audio data. For example, the control parameters may include video data indicating that a player is upset, audio data indicating that a player is yelling, or any other video data and/or audio data. Based on the video data and/or audio data, the game development application 109 may generate control parameters that identify the state or emotion of the player.

In some embodiments, the game development application 109 may not receive control parameters. For example, the game development application 109 may not receive control parameters associated with the electronic game, the player, the character, etc.

At step 406, the game development application 109 provides the pose data and the control parameters to the machine learning model 110. The game development application 109 may provide the pose data and the control parameters to the machine learning model 110 to identify a facial expression associated with the pose data.

FIG. 4B is an operation diagram 400B for generating a facial expression parameter and/or facial expression data based on the pose data and/or the control parameters. At step 408, the game development application 109 applies the machine learning model 110 to the input (e.g., the pose data and the control parameters). In some embodiments, the game development application 109 may apply the machine learning model 110 to the pose data without the control parameters. The machine learning model 110 may be trained to generate a particular facial expression parameter and/or facial expression data based on the input (e.g., the pose data and/or the control parameters).

The machine learning model 110 may map the input to a particular latent representation. For example, the machine learning model 110 may map the input to a latent representation in a latent space. Based on the latent representation, the machine learning model 110 may generate an output. In some embodiments, the machine learning model 110 may be trained to generate the output for a particular character based on inputs (e.g., pose data) associated with a different character and/or multiple characters. For example, the pose data may indicate that a first character completed a task (e.g., a football player scored a touchdown in a football game) and the facial expression parameter and/or the facial expression data for a second character associated with the first character (e.g., a spectator watching the football game) may be based on the pose data associated with the first character.

At block 410, the game development application 109 generates a facial expression 411. To generate the facial expression 411, the game development application 109 may generate a plurality of factors. For example, the plurality of factors may include a mesh corresponding to the facial expression 411 of the character (e.g., a morph mesh), a muscle set corresponding to the facial expression 411 of the character (e.g., particular muscles associated with the character), a displacement map corresponding to the facial expression 411 of the character (e.g., a displacement of particular features (e.g., muscles, portions, etc.) of the face of the character), a shader parameter corresponding to the facial expression 411 of the character (e.g., values corresponding to particular pixels based on a lighting input associated with the particular pixels), textures corresponding to the facial expression 411 of the character (e.g., one or more texture maps), or any other factor used to generate the facial expression 411. Based on the plurality of factors, the game development application 109 may generate the facial expression 411.

In other embodiments, the output may be one or more facial expression parameters 413. At block 412, the game development application 109 generates one or more facial expression parameters 413. The one or more facial expression parameters 413 may include one or more parameters (e.g., labels) to identify the facial expression 411. For example, the one or more facial expression parameters 413 may include one or more parameters identifying a particular state and/or emotion of a particular character. Further, each of the one or more facial expression parameters 413 may include a particular weight or probability. For example, each of the one or more facial expression parameters 413 may be associated with particular weights (e.g., a particular percentage, a particular numerical value, etc.) indicating how to generate the facial expression 411. In another example, each of the one or more facial expression parameters 413 may be associated with particular probabilities (e.g., a probability between 0% and 100%) indicating a likelihood that a particular facial expression parameter corresponds to the actual state or emotion of the character.

In the example of FIG. 4B, the facial expression parameters 413 include a facial expression parameter of "Happy" with a weight or probability of "80%," a facial expression parameter of "Puzzled" with a weight or probability of "15%," and a facial expression parameter of "Excited" with a weight or probability of "5%." It will be understood that more, less, or different facial expression parameters and/or more, less, or different weights and/or probabilities may be utilized.

The facial expression parameters 413 may be system agnostic. Further, the facial expression parameters 413 may be electronic game agnostic and/or computing device agnostic. Therefore, the facial expression parameters 413 may be applied across different electronic games, different development computing devices, different development computing systems, etc.

In some embodiments, the machine learning model 110 may output both the facial expression 411 and the facial expression parameters 413.

Further, the game development application 109 (e.g., via the machine learning model 110) may confirm the facial expression 411 and/or the facial expression parameters 413 associated with a particular character. For example, the game development application 109 may confirm that facial expressions and/or facial expression parameters for multiple characters are consistent. Further, the game development application 109 may determine that particular characters are related (e.g., are talking, are in a same crowd, are playing the same game, are doing the same activity, are on the same team, etc.). Based on this determination, the game development application 109 may determine whether the facial expression parameters and/or the facial expressions for particular characters are consistent. The game development application 109 may determine whether the facial expression parameters and/or the facial expressions are consistent by determining whether the different expressions and/or parameters are related (e.g., the expressions are both the same type of expressions (e.g., happy expressions), the expressions are within a particular threshold range of similarity (e.g., 75% similar), etc.)

If a particular facial expression and/or facial expression parameter has a higher probability, the game development application 109 may confirm that other facial expressions and/or facial expression parameters are consistent the facial expression and/or facial expression parameter with the higher probability. If the facial expressions and/or the facial expression parameters are not consistent, the game development application 109 may regenerate the other facial expressions and/or the other facial expression parameters based on the other facial expressions and/or the other facial expression parameters having a lower probability.

At step 414, the game development application 109 provides output (e.g., the facial expression parameters 413 and/or the facial expression 411). The game development application 109 may provide the facial expression parameters 413 to a subsequent machine learning model to generate the facial expression 411. Further, the game development application 109 may provide the facial expression 411 to a developer via a user interface as a recommended facial expression for a character. In some embodiments, the game development application 109 may update game data to include the facial expression 411.

6.0 Generating Facial Expression Parameters of a Character

Figure 5:
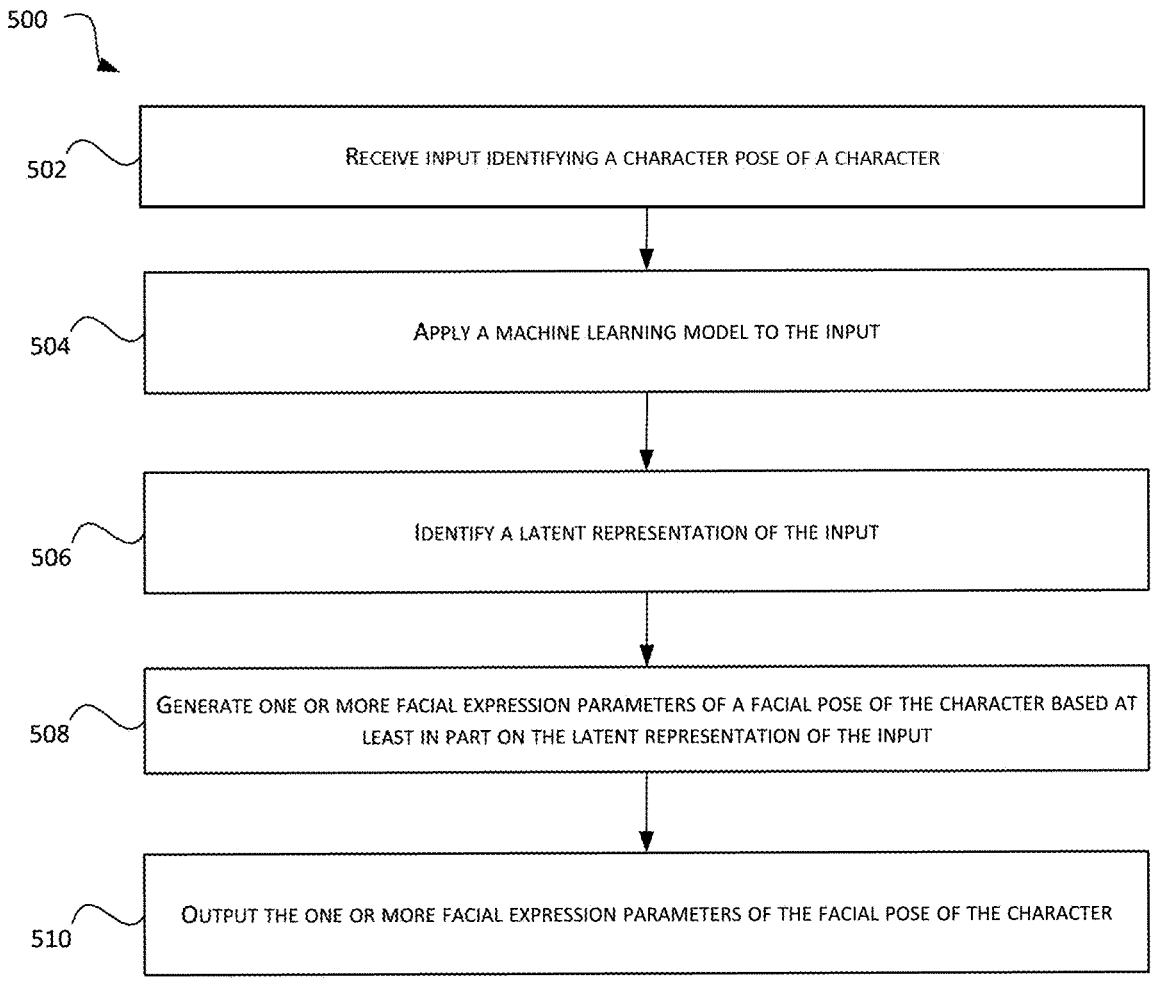
FIG. 5 illustrates an example flowchart for a method for generating a facial expression of a character based on a pose of the character.

FIG. 5 illustrates an embodiment of an example flowchart for a process 500 for generating facial expression parameters for a character based on pose data associated with the character. The process 500 can be implemented by any system that can implement the machine learning model. For example, the process 500, in whole or in part, can be implemented by a game development application 109, at least one CPU 107, at least one GPU 108, of a computing device 106, a game development server 102, or any other computing system. The hardware computing resources (e.g., CPU 107, GPU 108) may execute a game development application for development of a game application. For example, the game development application may be executed for generating character data that includes pose data and/or facial expression data. Although any number of systems, in whole or in part, can implement the process 500, to simplify discussion, the process 500 will be described with respect to particular systems. Further, although embodiments of the process 500 may be performed with respect to variations of systems comprising various game application environments, to simplify discussion, the process 500 will be described with respect to a particular interactive computing system.

In some embodiments, the game development application can receive input identifying a character pose of a character at 502. The character pose of the character may be a pose of character (e.g., a pose of the body of a character, a pose of the skeleton of a character, a pose of the silhouette of a character, etc.) based on the joints and/or bones of the character excluding the joints and/or bones of a face of the character. Further, each of the plurality of joints and/or bones may be included on a character skeleton associated with the character. A system may capture character data (e.g., motion capture data associated with a motion capture sensor and/or key-frame data) identifying the joints and/or bones of the character. The system may define the character pose of the character using information (e.g., position information, orientation information, location information, etc.) associated with a plurality of joints and/or bones of a skeleton of the character identified via the character data. The system may define the input based on the character data and provide the input to the game development application. Further, the input may be associated with a single frame or a plurality of frames. The game development application may process the input in order to generate pose data associated with the character pose.

In some embodiments, the game development application may also receive additional input. For example, the additional input may include one or more of image data, audio data, a context of an electronic game associated with the character, a genre of the electronic game, labels associated with the character, player data associated with the player, or any other data.

In some embodiments, the game development application applies a machine learning model to the input at 504. The machine learning model may generate a facial pose (or one or more facial expression parameters of the facial pose) of the character based at least in part on the pose data (e.g., the character pose of the character). In some embodiments, the machine learning model may generate a facial expression of the character using the one or more facial expression parameters and/or the facial pose. In other embodiments, the machine learning model may provide the facial expression parameters of the facial pose and/or the facial pose to another computing device to generate the facial expression.

The machine learning model may be trained based on a plurality of facial expression parameters and pose data (e.g., a plurality of poses). To train the machine learning model, the game development application may obtain a training data set including the plurality of facial expression parameters and the pose data. Further, the training data set may identify a particular pose and expected facial expression parameters for the particular pose. The game development application may train the machine learning model using the training data set. In some embodiments, the game development application may apply the machine learning model to the input and the additional input.

In some embodiments, the game development application identifies a latent representation of the input at 506. For example, the game development application may identify the latent representation of the input by applying the machine learning model to the input. In some embodiments, the game development application may identify a latent representation of the input and the additional input.

In some embodiments, the game development application generates one or more facial expression parameters of a facial pose of the character based at least in part on the latent representation of the input at 508. The game development application may further generate the one or more facial expression parameters by applying the machine learning model to the input. The one or more facial expression parameters may include one or more labels identifying an emotion or state of the character (e.g., happy, sad, distraught, fear, discomfort, etc.). Further, each of the one or more facial expression parameters may be associated with a weight or probability.

In some embodiments, the game development application generates facial expression data of the character based at least in part on the latent representation of the input. For example, the game development application may apply a second machine learning model to the one or more facial expression parameters. The second machine learning model may be trained on an additional plurality of facial expression parameters and facial expression data. Further, the game development application may apply the second machine learning model to identify a latent representation of the one or more facial expression parameters and generate a facial expression of the character based on the latent representation. The game development application may output the facial expression. In some embodiments, the facial expression may include one or more of a morph mesh, a displacement map, a shader parameter, a muscle set, a label, etc. Further, the facial expression may be associated with a probability. In some embodiments, the game development application may output the probability.

In some embodiments, the game development application outputs the one or more facial expression parameters of the character at 510. For example, the game development application may output the one or more facial expression parameters to another machine learning model for generation of the facial expression or to a developer computing device a set of recommended facial expression parameters for the character. In some embodiments, the game development application may generate an output by combining the pose of the character and the facial expression parameters and/or the facial expression of the character. Further, the game development application may provide the output to a computing device (e.g., as a recommendation). For example, the game development application may provide the one or more facial expression parameters and/or the facial expression as a recommendation based on the one or more facial expression parameters.

In some embodiments, the game development application may apply a second machine learning model to the input. The second machine learning model may be trained on an additional plurality of facial expression parameters and additional pose data. Further, the game development application may apply the second machine learning model to identify a second latent representation of the input and generate one or more second facial expression parameters of a second character based on the second latent representation. The game development application may output the one or more second facial expression parameters.

Further, the game development application may apply a third machine learning model to the one or more facial expression parameters and the one or more second facial expression parameters. The third machine learning model may be trained on an additional plurality of facial expression parameters and facial expression data. Further, the game development application may apply the third machine learning model to identify a third latent representation of the one or more facial expression parameters and the one or more second facial expression parameters and generate a facial expression of the character based on the third latent representation. The game development application may output the facial expression.

In some embodiments, the third machine learning model may generate a facial expression for a first character and a facial expression of a second character. Further, the game development application may compare the facial expressions to determine if the facial expressions are within a particular range of facial expressions. Based on determining the facial expressions are within the particular range, the game development application may output each facial expression.

7.0 Overview of Computing Device

Figure 6:
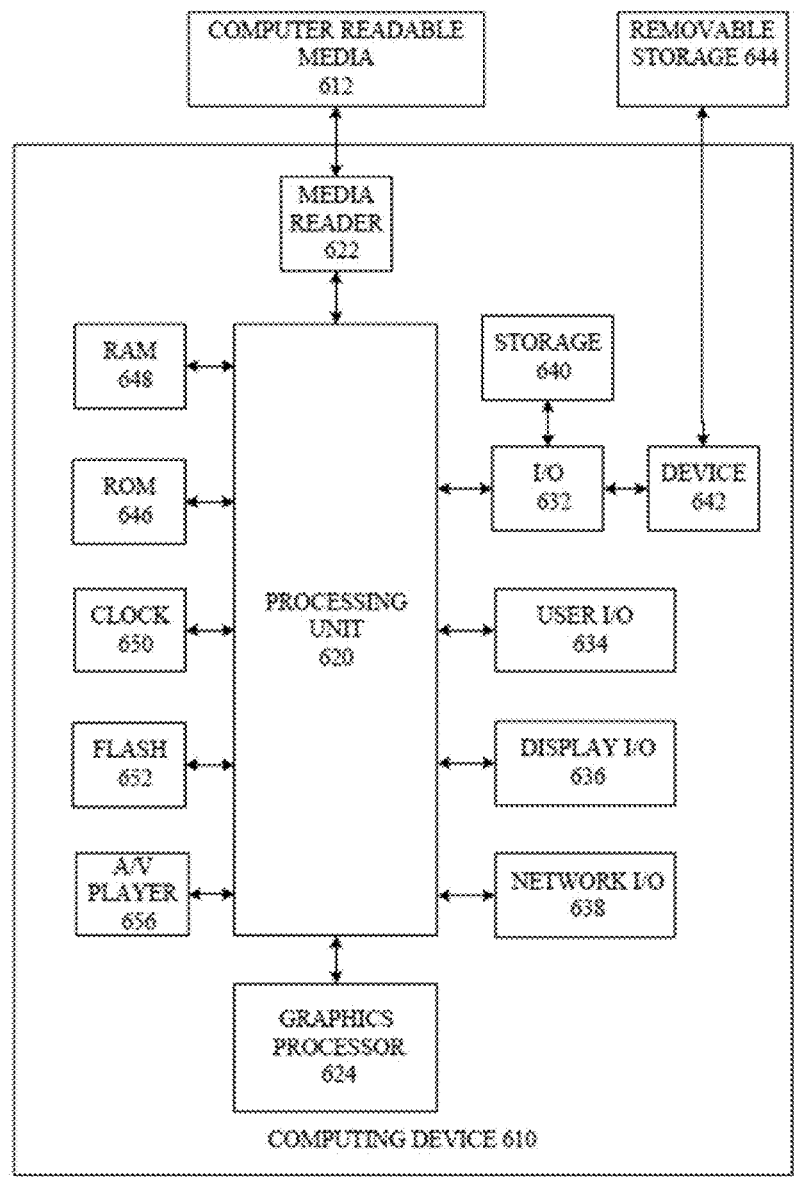
FIG. 6 illustrates an embodiment of a computing device.

FIG. 6 illustrates an embodiment of computing device 610 according to the present disclosure. Other variations of the computing device 610 may be substituted for the examples explicitly presented herein, such as removing or adding components to the computing device 106. The computing device 610 may include a game device, a smart phone, a tablet, a personal computer, a laptop, a smart television, a car console display, a server, and the like. As shown, the computing device 610 includes a processing unit 620 that interacts with other components of the computing device 610 and also external components to computing device 610. A media reader 622 is included that communicates with media 612. The media reader 622 may be an optical disc reader capable of reading optical discs, such as CD-ROM or DVDs, or any other type of reader that can receive and read data from game media 612. One or more of the computing devices may be used to implement one or more of the systems disclosed herein.

Computing device 610 may include a separate graphics processor 624. In some cases, the graphics processor 624 may be built into the processing unit 620. In some such cases, the graphics processor 624 may share Random Access Memory (RAM) with the processing unit 620. Alternatively, or in addition, the computing device 610 may include a discrete graphics processor 624 that is separate from the processing unit 620. In some such cases, the graphics processor 624 may have separate RAM from the processing unit 620. Computing device 610 might be a handheld video game device, a dedicated game console computing system, a general-purpose laptop or desktop computer, a smart phone, a tablet, a car console, or other suitable system.

Computing device 610 also includes various components for enabling input/output, such as an I/O 632, a user I/O 634, a display I/O 636, and a network I/O 638. I/O 632 interacts with storage element 640 and, through a device 642, removable storage media 644 in order to provide storage for computing device 610. Processing unit 620 can communicate through I/O 632 to store data, such as game state data and any shared data files. In addition to storage 640 and removable storage media 644, computing device 610 is also shown including ROM (Read-Only Memory) 646 and RAM 648. RAM 648 may be used for data that is accessed frequently, such as when a game is being played or the fraud detection is performed.

User I/O 634 is used to send and receive commands between processing unit 620 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 636 provides input/output functions that are used to display images from the game being played. Network I/O 638 is used for input/output functions for a network. Network I/O 638 may be used during execution of a game, such as when a game is being played online or being accessed online and/or application of fraud detection, and/or generation of a fraud detection model.

Display output signals produced by display I/O 636 comprising signals for displaying visual content produced by computing device 610 on a display device, such as graphics, user interfaces, video, and/or other visual content. Computing device 610 may comprise one or more integrated displays configured to receive display output signals produced by display I/O 636. According to some embodiments, display output signals produced by display I/O 636 may also be output to one or more display devices external to computing device 610, such a display 616.

The computing device 610 can also include other features that may be used with a game, such as a clock 650, flash memory 652, and other components. An audio/video player 656 might also be used to play a video sequence, such as a movie. It should be understood that other components may be provided in computing device 610 and that a person skilled in the art will appreciate other variations of computing device 610.

Program code can be stored in ROM 646, RAM 648 or storage 640 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 640, and/or on removable media such as game media 612 (which can be a CD-ROM, cartridge, memory chip or the like, or obtained over a network or other electronic channel as needed). In general, program code can be found embodied in a tangible non-transitory signal-bearing medium.

Random access memory (RAM) 648 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 648 is volatile storage and data stored within RAM 648 may be lost when the computing device 610 is turned off or loses power.

As computing device 610 reads media 612 and provides an application, information may be read from game media 612 and stored in a memory device, such as RAM 648. Additionally, data from storage 640, ROM 646, servers accessed via a network (not shown), or removable storage media 646 may be read and loaded into RAM 648. Although data is described as being found in RAM 648, it will be understood that data does not have to be stored in RAM 648 and may be stored in other memory accessible to processing unit 620 or distributed among several media, such as media 612 and storage 640.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
   one or more processors; and
   a computer-readable storage medium including machine-readable instructions that, when executed by the one or more processors, cause the one or more processors to execute a game development application, the game development application configured to:
      receive a first input identifying a character pose of a first virtual character, the character pose of the first virtual character being defined by location information of a plurality of joints of a character skeleton;
apply a first machine learning model to the character pose of the first virtual character, wherein the first machine learning model is configured to generate one or more facial expression parameters of a facial expression of the first virtual character based at least in part on the character pose of the first virtual character, wherein the first machine learning model is trained based on mappings of character pose inputs to facial expression parameter outputs, wherein the game development application is configured to apply the first machine learning model to the character pose of the first virtual character to:
identify a first latent representation of the character pose of the first virtual character in latent space, and
generate the one or more facial expression parameters of the facial expression of the first virtual character based at least in part on the first latent representation of the character pose of the first virtual character; and
output the one or more facial expression parameters of the facial expression of the first virtual character, wherein a pose of a first portion of a character model of the first virtual character comprises the character pose of the first virtual character that is identified based at least in part on the first input, wherein an expression of a second portion of the character model of the first virtual character comprises the facial expression of the first virtual character that is generated based at least in part on the first latent representation of the character pose of the first virtual character, and wherein the first portion of the character model of the first virtual character is separate from the second portion of the character model of the first virtual character.

2. The system of claim 1, wherein the game development application is further configured to:
receive a second input identifying at least one of image data associated with the first virtual character, audio data associated with the first virtual character, player data of a player associated with the first virtual character, a context of a video game associated with the first virtual character, a genre of the video game associated with the first virtual character, or one or more labels associated with the first virtual character, wherein to apply the first machine learning model to the character pose of the first virtual character, the game development application is further configured to apply the first machine learning model to the character pose of the first virtual character and the second input, wherein the first latent representation of the character pose of the first virtual character is a first latent representation of the character pose of the first virtual character and the second input.

3. The system of claim 1, wherein the first input comprises at least one of motion capture data associated with a motion capture sensor or key-frame data.

4. The system of claim 1, wherein the game development application is further configured to:
apply a second machine learning model to the character pose of the first virtual character, wherein the second machine learning model is configured to generate one or more facial expression parameters of a facial pose of a second virtual character based at least in part on the character pose of the first virtual character, wherein the game development application is configured to apply the second machine learning model to the character pose of the first virtual character to:
identify a second latent representation of the character pose of the first virtual character in latent space, and
generate the one or more facial expression parameters of the facial pose of the second virtual character based at least in part on the second latent representation of the character pose of the first virtual character; and
output the one or more facial expression parameters of the facial pose of the second virtual character.

5. The system of claim 1, wherein the one or more facial expression parameters of the facial expression of the first virtual character comprise one or more labels, each of the one or more facial expression parameters of the facial expression of the first virtual character identifying an emotion of the first virtual character and associated with a particular weight.

6. The system of claim 1, wherein the game development application is further configured to:
apply a second machine learning model to the character pose of the first virtual character, wherein the second machine learning model is configured to generate one or more facial expression parameters of a facial pose of a second virtual character based at least in part on the character pose of the first virtual character, wherein the game development application is configured to apply the second machine learning model to the character pose of the first virtual character to:
identify a second latent representation of the character pose of the first virtual character in latent space, and
generate the one or more facial expression parameters of the facial pose of the second virtual character based at least in part on the second latent representation of the character pose of the first virtual character;
output the one or more facial expression parameters of the facial pose of the second virtual character;
apply a third machine learning model to the one or more facial expression parameters of the facial expression of the first virtual character and the one or more facial expression parameters of the facial pose of the second virtual character, wherein the third machine learning model is configured to generate the facial expression of the first virtual character based at least in part on the one or more facial expression parameters of the facial expression of the first virtual character and the one or more facial expression parameters of the facial pose of the second virtual character, wherein the game development application is configured to apply the third machine learning model to the one or more facial expression parameters of the facial expression of the first virtual character and the one or more facial expression parameters of the facial pose of the second virtual character to:
identify a latent representation of the one or more facial expression parameters of the facial expression of the first virtual character and the one or more facial expression parameters of the facial pose of the second virtual character, and
generate the facial expression of the first virtual character based at least in part on the latent representation of the one or more facial expression parameters of the facial expression of the first virtual character and the one or more facial expression parameters of the facial pose of the second virtual character; and
output the facial expression of the first virtual character.

7. The system of claim 1, wherein the game development application is further configured to:
- apply a second machine learning model to the character pose of the first virtual character, wherein the second machine learning model is configured to generate one or more facial expression parameters of a facial pose of a second virtual character based at least in part on the character pose of the first virtual character, wherein the game development application is configured to apply the second machine learning model to the character pose of the first virtual character to:
  - identify a second latent representation of the character pose of the first virtual character in latent space, and
  - generate the one or more facial expression parameters of the facial pose of the second virtual character based at least in part on the second latent representation of the character pose of the first virtual character;
- output the one or more facial expression parameters of the facial pose of the second virtual character;
- apply a third machine learning model to the one or more facial expression parameters of the facial expression of the first virtual character and the one or more facial expression parameters of the facial pose of the second virtual character, wherein the third machine learning model is configured to generate the facial expression of the first virtual character based at least in part on the one or more facial expression parameters of the facial expression of the first virtual character and the one or more facial expression parameters of the facial pose of the second virtual character, wherein the game development application is configured to apply the third machine learning model to the one or more facial expression parameters of the facial expression of the first virtual character and the one or more facial expression parameters of the facial pose of the second virtual character to:
  - identify a latent representation of the one or more facial expression parameters of the facial expression of the first virtual character and a latent representation of the one or more facial expression parameters of the facial pose of the second virtual character, and
  - generate the facial expression of the first virtual character based at least in part on the latent representation of the one or more facial expression parameters of the facial expression of the first virtual character and a facial expression of the second virtual character based at least in part on the latent representation of the one or more facial expression parameters of the facial pose of the second virtual character;
- determine the facial expression of the first virtual character and the facial expression of the second virtual character are within a particular range of facial expressions; and
- output the facial expression of the first virtual character and the facial expression of the second virtual character based at least in part on determining the facial expression of the first virtual character and the facial expression of the second virtual character are within the particular range of facial expressions.

8. The system of claim 1, wherein the first input is associated with a single frame or a plurality of frames.

9. The system of claim 1, wherein the game development application is further configured to:
- obtain a training data set, wherein the training data set indicates the mappings of the character pose inputs to the facial expression parameter outputs; and
- train the first machine learning model using the training data set.

10. The system of claim 1, wherein the game development application is further configured to:
- apply a second machine learning model to the one or more facial expression parameters of the facial expression of the first virtual character, wherein the second machine learning model is configured to generate the facial expression of the first virtual character based at least in part on the one or more facial expression parameters of the facial expression of the first virtual character, wherein the game development application is configured to apply the second machine learning model to the one or more facial expression parameters of the facial expression of the first virtual character to:
  - identify a latent representation of the one or more facial expression parameters of the facial expression of the first virtual character, and
  - generate the facial expression of the first virtual character based at least in part on the latent representation of the one or more facial expression parameters of the facial expression of the first virtual character; and
- output the facial expression of the first virtual character, wherein the facial expression of the first virtual character comprises at least one of one or more morph meshes, one or more displacement maps, one or more shader parameters, one or more muscle sets, or one or more labels.

11. The system of claim 1, wherein the game development application is further configured to:
- apply a second machine learning model to the one or more facial expression parameters of the facial expression of the first virtual character, wherein the second machine learning model is configured to generate the facial expression of the first virtual character based at least in part on the one or more facial expression parameters of the facial expression of the first virtual character, wherein the game development application is configured to apply the second machine learning model to the one or more facial expression parameters of the facial expression of the first virtual character to:
  - identify a latent representation of the one or more facial expression parameters of the facial expression of the first virtual character, and
  - generate the facial expression of the first virtual character and a probability associated with the facial expression of the first virtual character based at least in part on the latent representation of the one or more facial expression parameters of the facial expression of the first virtual character; and
- output the facial expression of the first virtual character and the probability associated with the facial expression of the first virtual character.

12. The system of claim 1, wherein the game development application is further configured to:
- generate an output by combining the character pose of the first virtual character and the one or more facial expression parameters of the facial expression of the first virtual character; and
- provide the output to a computing device.

13. The system of claim 1, wherein to output the one or more facial expression parameters of the facial expression of the first virtual character, the game development application is further configured to:
- output a recommendation that recommends the facial expression of the first virtual character for the first virtual character based at least in part on the one or more facial expression parameters of the facial expression of the first virtual character.

14. A computer-implemented method comprising:
as implemented by an interactive computing system configured with specific computer-executable instructions during runtime of a game development application,
receiving a first input identifying a character pose of a virtual character, the character pose of the virtual character being defined by location information of a plurality of joints of a character skeleton;
applying a first machine learning model to the character pose of the virtual character, wherein the first machine learning model is configured to generate one or more facial expression parameters of a facial expression of the virtual character based at least in part on the character pose of the virtual character, wherein the first machine learning model is trained based on mappings of character pose inputs to facial expression parameter outputs, wherein applying the first machine learning model to the character pose of the virtual character comprises:
identifying a latent representation of the character pose of the virtual character in latent space, and
generating the one or more facial expression parameters of the facial expression of the virtual character based at least in part on the latent representation of the character pose of the virtual character; and
outputting the one or more facial expression parameters of the facial expression of the virtual character, wherein a pose of a first portion of a character model of the virtual character comprises the character pose of the virtual character that is identified based at least in part on the first input, wherein an expression of a second portion of the character model of the virtual character comprises the facial expression of the virtual character that is generated based at least in part on the latent representation of the character pose of the virtual character, and wherein the first portion of the character model of the virtual character is separate from the second portion of the character model of the virtual character.

15. The computer-implemented method of claim 14 further comprising:
applying a second machine learning model to the one or more facial expression parameters of the facial expression of the virtual character, wherein the second machine learning model is configured to generate the facial expression of the virtual character based at least in part on the one or more facial expression parameters of the facial expression of the virtual character, wherein applying the second machine learning model to the one or more facial expression parameters of the facial expression of the virtual character comprises:
identifying a latent representation of the one or more facial expression parameters of the facial expression of the virtual character, and
generating the facial expression of the virtual character based at least in part on the latent representation of the one or more facial expression parameters of the facial expression of the virtual character; and
outputting the facial expression of the virtual character.

16. The computer-implemented method of claim 14 further comprising:
receiving a second input identifying at least one of image data associated with the virtual character, audio data associated with the virtual character, player data of a player associated with the virtual character, a context of a video game associated with the virtual character, a genre of the video game associated with the virtual character, or one or more labels associated with the virtual character, wherein applying the first machine learning model to the character pose of the virtual character further comprises applying the first machine learning model to the character pose of the virtual character and the second input, wherein the latent representation of the character pose of the virtual character is a latent representation of the character pose of the virtual character and the second input.

17. The computer-implemented method of claim 14 further comprising:
generating an output by combining the character pose of the virtual character and the one or more facial expression parameters of the facial expression of the virtual character; and
providing the output to a computing device.

18. A non-transitory computer-readable medium storing computer-executable instructions that, when executed by one or more computing devices, configure the one or more computing devices to execute a game development application, the game development application configured to:
receive a first input identifying a character pose of a virtual character, the character pose of the virtual character being defined by location information of a plurality of joints of a character skeleton;
apply a first machine learning model to the character pose of the virtual character, wherein the first machine learning model is configured to generate one or more facial expression parameters of a facial expression of the virtual character based at least in part on the character pose of the virtual character, wherein the first machine learning model is trained based on mappings of character pose inputs to facial expression parameter outputs, wherein the game development application is configured to apply the first machine learning model to the character pose of the virtual character to:
identify a latent representation of the character pose of the virtual character in latent space, and
generate the one or more facial expression parameters of the facial expression of the virtual character based at least in part on the latent representation of the character pose of the virtual character; and
output the one or more facial expression parameters of the facial expression of the virtual character, wherein a pose of a first portion of a character model of the virtual character comprises the character pose of the virtual character that is identified based at least in part on the first input, wherein an expression of a second portion of the character model of the virtual character comprises the facial expression of the virtual character that is generated based at least in part on the latent representation of the character pose of the virtual character, and wherein the first portion of the character model of the virtual character is separate from the second portion of the character model of the virtual character.

19. The non-transitory computer-readable medium of claim 18, wherein the game development application is further configured to:
apply a second machine learning model to the one or more facial expression parameters of the facial expression of the virtual character, wherein the second machine learning model is configured to generate the facial expression of the virtual character based at least in part on the one or more facial expression parameters of the facial expression of the virtual character, wherein the game development application is configured to apply the second machine learning model to the one or more facial expression parameters of the facial expression of the virtual character to:
  identify a latent representation of the one or more facial expression parameters of the facial expression of the virtual character, and
  generate the facial expression of the virtual character based at least in part on the latent representation of the one or more facial expression parameters of the facial expression of the virtual character; and
output the facial expression of the virtual character.

20. The non-transitory computer-readable medium of claim 18, wherein the game development application is further configured to:
  receive a second input identifying at least one of image data associated with the virtual character, audio data associated with the virtual character, player data of a player associated with the virtual character, a context of a video game associated with the virtual character, a genre of the video game associated with the virtual character, or one or more labels associated with the virtual character, wherein to apply the first machine learning model to the character pose of the virtual character, the game development application is further configured to apply the first machine learning model to the character pose of the virtual character and the second input, wherein the latent representation of the character pose of the virtual character is a latent representation of the character pose of the virtual character and the second input.

* * * * *